United States Patent
Sakai

(10) Patent No.: US 10,168,980 B2
(45) Date of Patent: Jan. 1, 2019

(54) INFORMATION PROCESSING SYSTEM AND INFORMATION PROCESSING METHOD

(71) Applicant: SONY CORPORATION, Tokyo (JP)

(72) Inventor: Yusuke Sakai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 97 days.

(21) Appl. No.: 15/117,242

(22) PCT Filed: Dec. 9, 2014

(86) PCT No.: PCT/JP2014/082591
§ 371 (c)(1),
(2) Date: Aug. 8, 2016

(87) PCT Pub. No.: WO2015/122087
PCT Pub. Date: Aug. 20, 2015

(65) Prior Publication Data
US 2016/0350059 A1 Dec. 1, 2016

(30) Foreign Application Priority Data

Feb. 17, 2014 (JP) .................................. 2014-027951

(51) Int. Cl.
*G06F 3/14* (2006.01)
*G06F 13/00* (2006.01)
(Continued)

(52) U.S. Cl.
CPC .......... *G06F 3/1454* (2013.01); *G06F 3/0486* (2013.01); *G06F 3/04883* (2013.01); *G06F 3/1462* (2013.01); *G06F 13/00* (2013.01); *G06F 17/30* (2013.01); *G06F 17/30873* (2013.01); *G09G 5/00* (2013.01); *G09G 5/005* (2013.01); *G09G 5/12* (2013.01); *H04L 67/1095* (2013.01);
(Continued)

(58) Field of Classification Search
None
See application file for complete search history.

(56) References Cited

U.S. PATENT DOCUMENTS

2006/0136828 A1* 6/2006 Asano .................. G06F 3/1454
715/733
2008/0238954 A1* 10/2008 Hasuike ................ G06F 3/0421
345/698
(Continued)

FOREIGN PATENT DOCUMENTS

JP 2006-518507 A 8/2006
JP 2009-105818 A 5/2009
(Continued)

*Primary Examiner* — Duane N Taylor, Jr.
(74) *Attorney, Agent, or Firm* — Chip Law Group

(57) ABSTRACT

To synchronize image display applications executed independently by each information processing device. Provided is an information processing system including a control unit configured to perform a control of synchronizing a first image display application executed by a first information processing device and a second image display application executed by a second information processing device. According to the present disclosure, if the first and the second information processing devices are each executing an image display application independently, the control unit can synchronize these image display applications.

15 Claims, 23 Drawing Sheets

(51) Int. Cl.
  *G09G 5/00*       (2006.01)
  *G06F 17/30*      (2006.01)
  *G06F 3/0486*     (2013.01)
  *G09G 5/12*       (2006.01)
  *H04L 29/08*      (2006.01)
  *G06F 3/0488*     (2013.01)
  *G06F 3/0484*     (2013.01)

(52) U.S. Cl.
  CPC ........ *H04L 67/148* (2013.01); *G06F 3/04845* (2013.01); *G09G 2340/04* (2013.01); *G09G 2354/00* (2013.01); *G09G 2370/02* (2013.01)

(56) References Cited

U.S. PATENT DOCUMENTS

| | | | |
|---|---|---|---|
| 2014/0189527 A1* | 7/2014 | Kruglick | G06F 9/4443 715/746 |
| 2014/0344220 A1* | 11/2014 | Chen | G06F 17/30174 707/626 |
| 2015/0149549 A1* | 5/2015 | Tsukamoto | H04L 12/1822 709/204 |

FOREIGN PATENT DOCUMENTS

| | | |
|---|---|---|
| JP | 2011-070511 A | 4/2011 |
| JP | 2012-238218 A | 12/2012 |

\* cited by examiner

INFORMATION PROCESSING SYSTEM AND INFORMATION PROCESSING METHOD

CROSS REFERENCE TO RELATED APPLICATIONS

This application is a U.S. National Phase of International Patent Application No. PCT/JP2014/082591 filed on Dec. 9, 2014, which claims priority benefit of Japanese Patent Application No. 2014-027951 filed in the Japan Patent Office on Feb. 17, 2014. Each of the above-referenced applications is hereby incorporated herein by reference in its entirety.

TECHNICAL FIELD

The present disclosure relates to an information processing system, an information processing method, and a program.

BACKGROUND ART

Patent Literature 1 discloses technology that causes an operation performed by one user on a webpage to be reflected on a webpage being viewed by another user. With this technology, operation information related to the operation performed by the one user on a webpage is transmitted to a server. Subsequently, the server processes the webpage on the basis of the operation information, and transmits the processed webpage to each user's terminal (information processing device). Subsequently, each user's information processing device displays the information provided by the server.

CITATION LIST

Patent Literature

Patent Literature 1: JP 2012-238218A

SUMMARY OF INVENTION

Technical Problem

In other words, with this technology, each user's information processing device only displays information provided by the server. Consequently, if each information processing device is executing an image display application independently, this technology is unable to synchronize these image display applications.

For this reason, there is demand for a technology that synchronizes image display applications executed independently by each information processing device.

Solution to Problem

According to the present disclosure, there is provided an information processing system including a control unit configured to perform a control of synchronizing a first image display application executed by a first information processing device and a second image display application executed by a second information processing device.

According to the present disclosure, there is provided an information processing method including performing a control of synchronizing a first image display application executed by a first information processing device and a second image display application executed by a second information processing device.

According to the present disclosure, there is provided a program for causing a computer to realize a control function configured to perform a control of synchronizing a first image display application executed by a first information processing device and a second image display application executed by a second information processing device.

According to the present disclosure, if the first and second information processing devices are executing image display applications independently, the control unit is able to synchronize these image display applications.

Advantageous Effects of Invention

According to the present disclosure as described above, if the first and the second information processing devices are executing image display applications independently, the control unit is able to synchronize these image display applications. The technology according to the present disclosure may include any of the advantageous effects described in this specification, or other advantageous effects.

DESCRIPTION OF EMBODIMENT(S)

Figure 1:
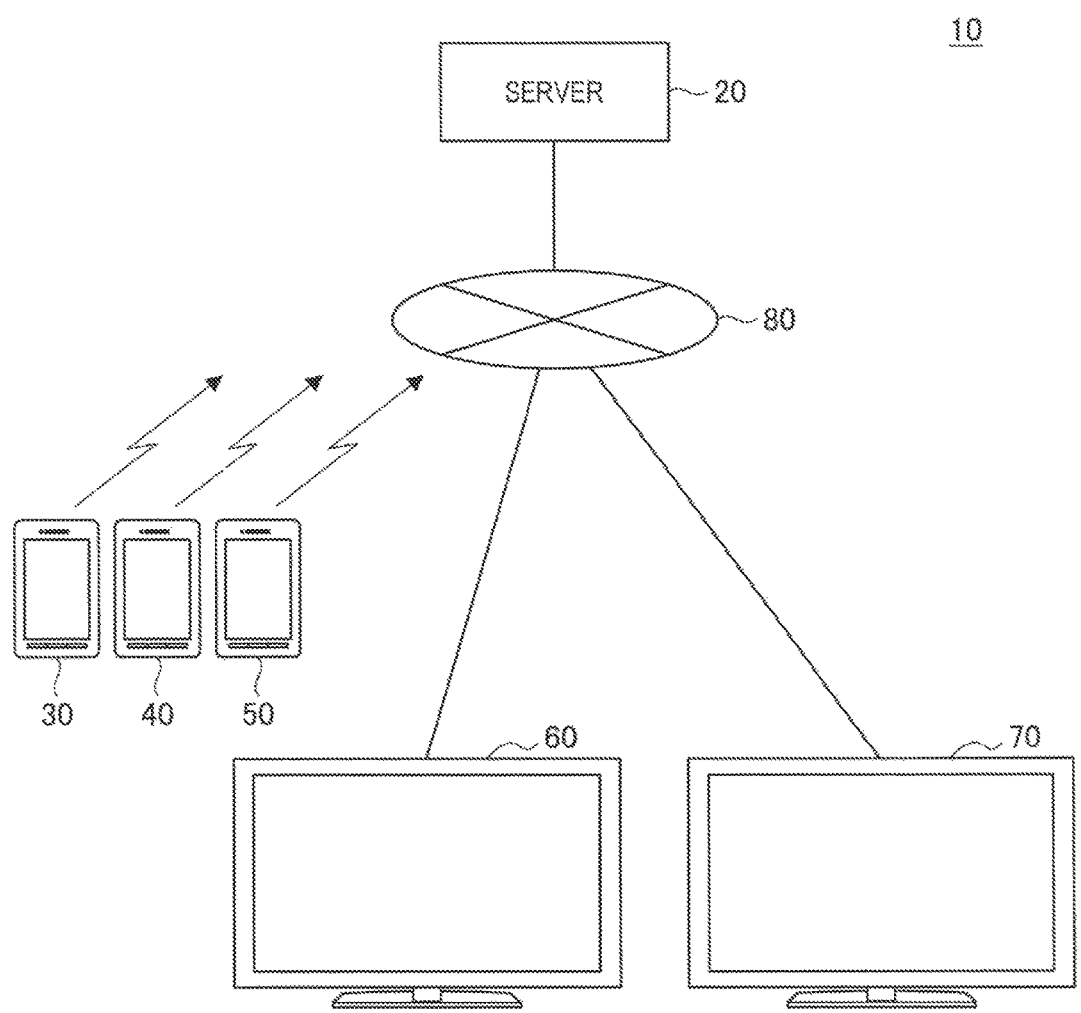
FIG. 1 is a block diagram illustrating an overall configuration of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Configuration of information processing system
   1-1. Overall configuration
   1-2. Overview of process
   1-3. Configuration of server
   1-4. Configuration of information processing device
2. Process by information processing system
   2-1. Presupposed process
   2-2. Basic process
   2-3. Example display by information processing device
   2-4. Display size adjustment process
   2-5. User withdrawal process
   2-6. Session management process
   2-7. Group-to-group sharing process
   2-8. Other processes <1. Configuration of Information Processing System>
(1-1. Overall Configuration)

First, an overall configuration of an information processing system 10 will be described on the basis of FIG. 1. The information processing system 10 includes a server 20, information processing devices 30 to 70, and a network 80. The server 20 synchronizes image display applications executed independently by the information processing devices 30 to 70. The information processing devices 30 to 70 respectively and independently execute image display applications. The server 20 and the information processing devices 30 to 70 are able to communicate with each other over the network 80. The network 80 may also be connected to devices other than the devices illustrated in FIG. 1, such as storage for image information, for example.

The information processing devices 30 to 50 are information processing devices that may be portably carried by users. Specifically, the information processing devices 30 to 50 may be devices such as smartphones, smart tablets, and mobile phones, for example. The information processing devices 60 and 70 are display devices viewed by multiple users. The configuration in FIG. 1 is merely one example of the present embodiment. For example, the information processing devices are not limited to the above example, and may be any devices capable of executing image display applications. Additionally, the number of information processing devices is not limited to the above example. Also, the functions of the server 20 may also be distributed among multiple devices.

(1-2. Overview of Process)

Figure 13:
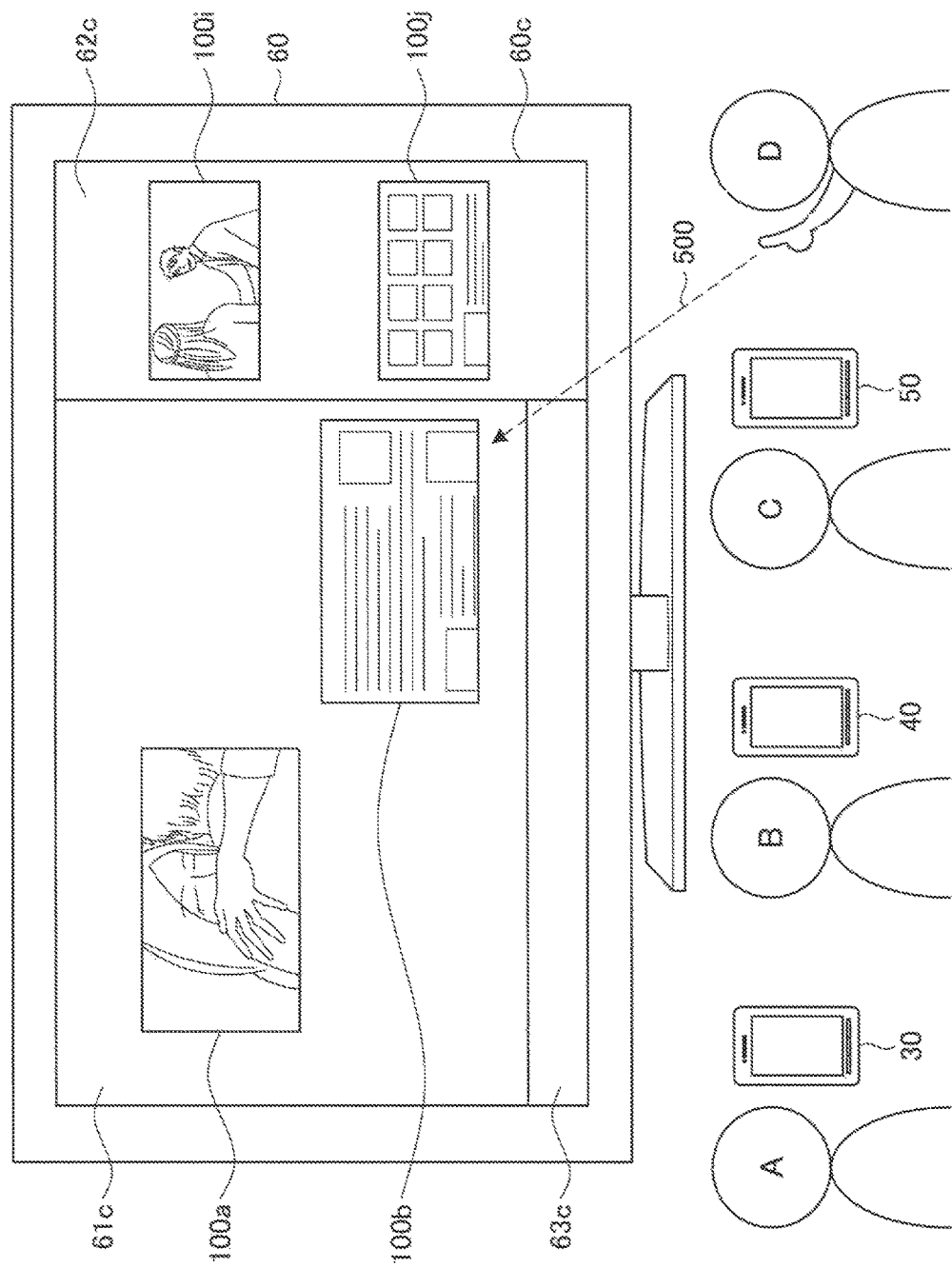
FIG. 13 is an explanatory diagram illustrating an example of a screen displayed by an information processing device, and users viewing the screen.
Figure 14:
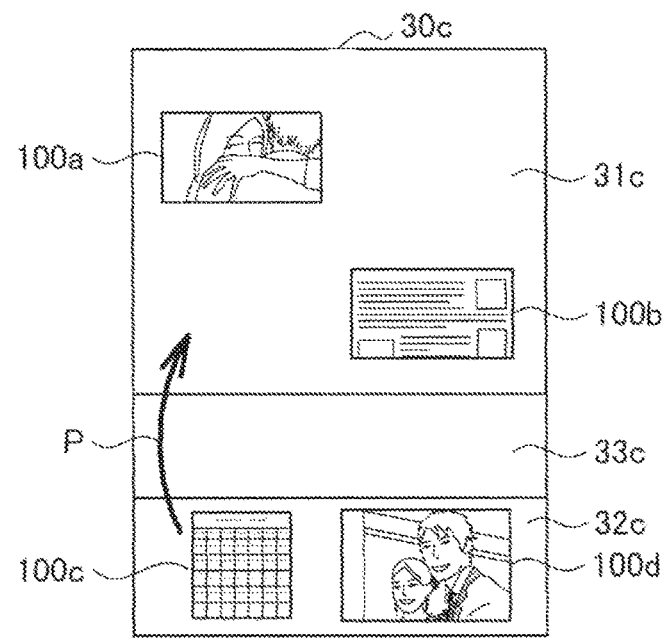
FIG. 14 is an explanatory diagram illustrating an example of a screen displayed by an information processing device.
Figure 15:
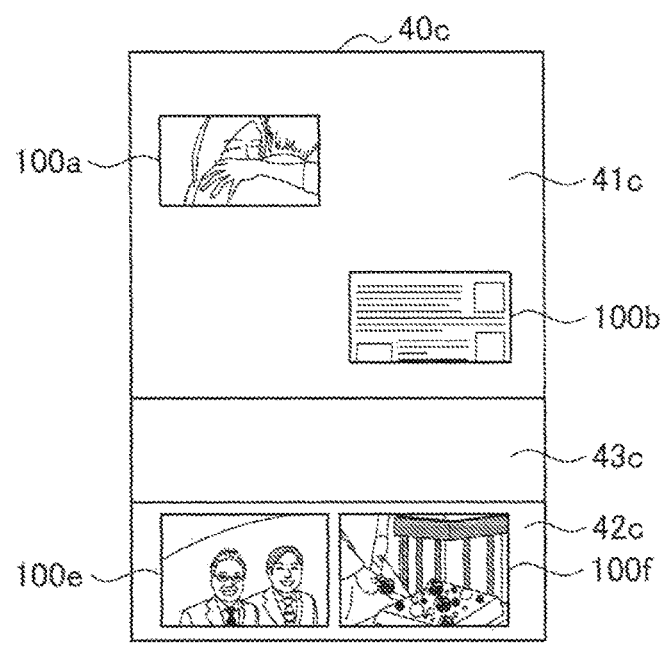
FIG. 15 is an explanatory diagram illustrating an example of a screen displayed by an information processing device.
Figure 16:
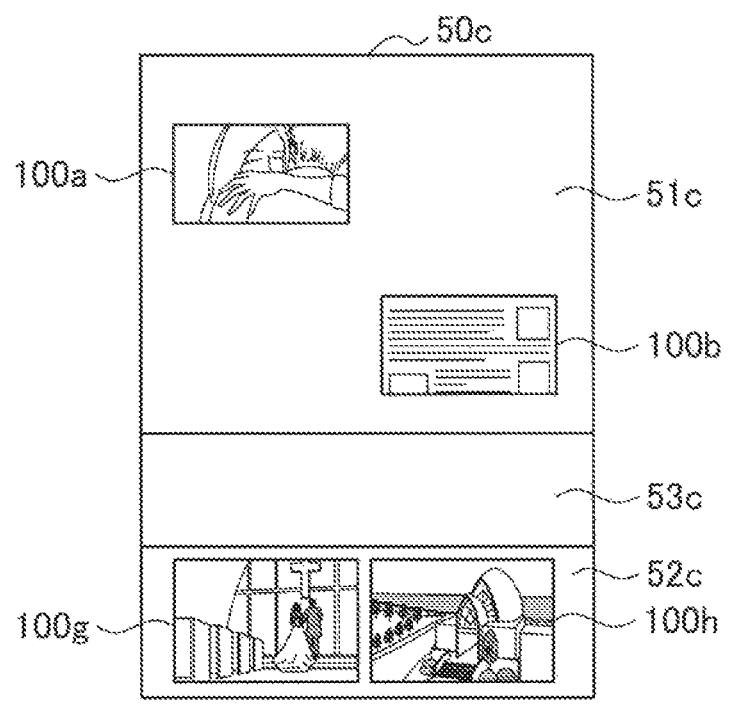
FIG. 16 is an explanatory diagram illustrating an example of a screen displayed by an information processing device.

Next, an overview of a process performed by the information processing system 1 will be described on the basis of FIG. 1 and FIGS. 13 to 21. In FIG. 13, users A to D are present around the information processing device 60, and the users A to D are viewing a display unit 60c (display screen) of the information processing device 60. Additionally, the users A to C are holding the information processing devices 30 to 50. The user D is not carrying an information processing device, but is able to operate the information processing device 60. Obviously, the other users A to C are also able to operate the information processing device 60.

First, the server 20 forms a session that includes the information processing devices 30 to 60. Herein, in the present embodiment, a session means a group of information processing devices that share image information. In the present embodiment, each session preferably includes one of the information processing devices 60 and 70, which are big screen displays. The server 20 causes information processing devices that have issued a session join request to join the session. Subsequently, the server 20 accepts information transmitted from the information processing devices that have joined the session.

On the other hand, as illustrated in FIGS. 13 to 16, the information processing devices 30 to 60 respectively and independently execute image display applications. In the image display applications, the display areas of display units 30c to 60c are partitioned into shared areas 31c to 61c, personal areas 32c to 62c, and temporary saving areas 33c to 63c. Hereinafter, the shared areas, personal areas, and temporary saving areas will also be designated the partitioned areas. In addition, the information processing devices 30 to 60 move respective image information inside the display area according to input operations (such as drag operations) by the users A to C.

For example, as illustrated in FIGS. 13 to 16, at a certain point in time, image information 100a and 100b is being displayed in the shared areas 31c to 61c. Also, image information 100c and 100d is displayed in the personal area 32c, while image information 100e and 100f is displayed in the personal area 42c. Also, image information 100g and 100h is displayed in the personal area 52c, while image information 100i and 100j is displayed in the personal area 62c.

Meanwhile, if there is a variation in the shared area and the temporary saving area of any information processing device, the server 20 causes the variation to be reflected in the shared areas and temporary saving areas of the other information processing devices.

Figure 17:
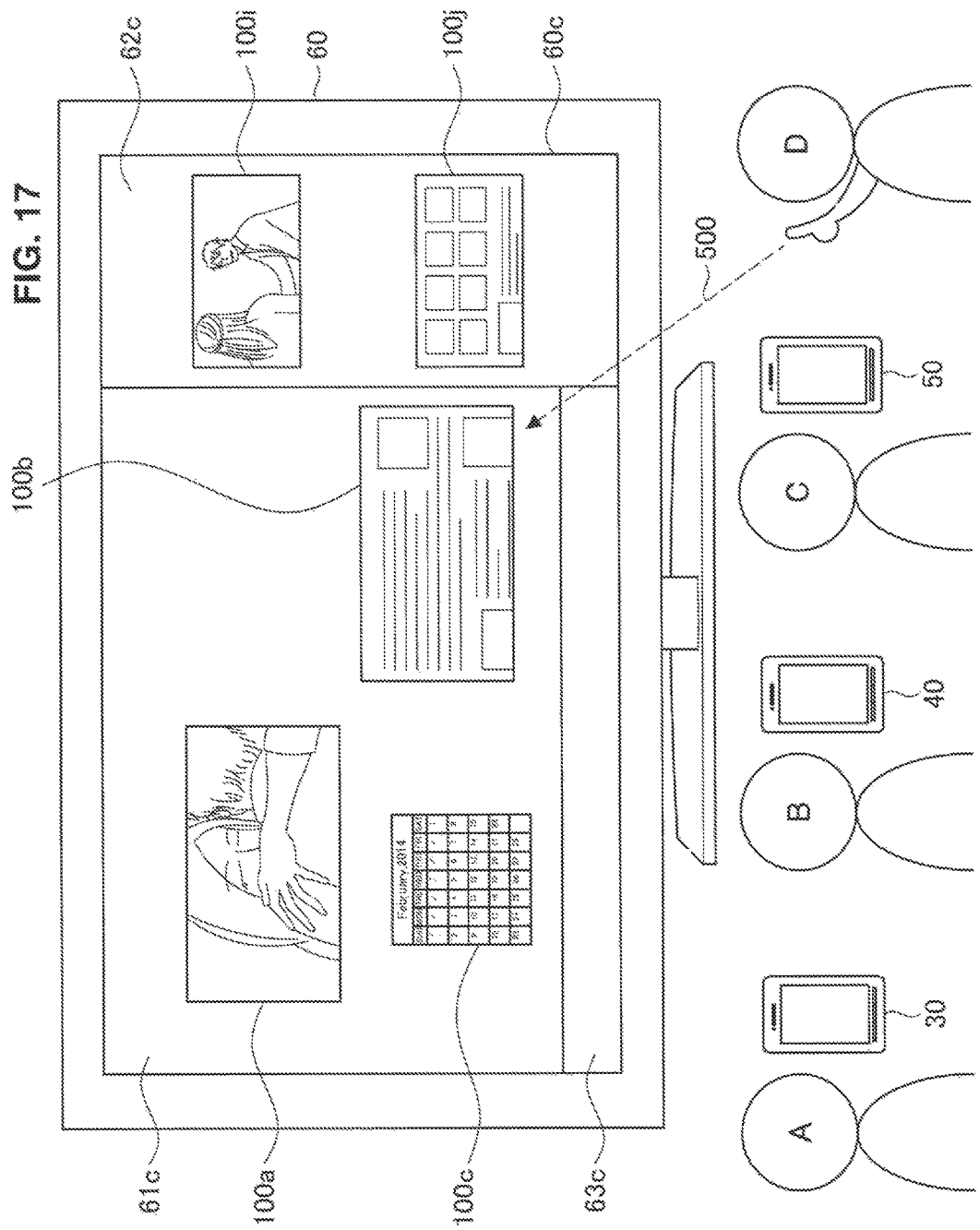
FIG. 17 is an explanatory diagram illustrating an example of a screen displayed by an information processing device, and users viewing the screen.
Figure 18:
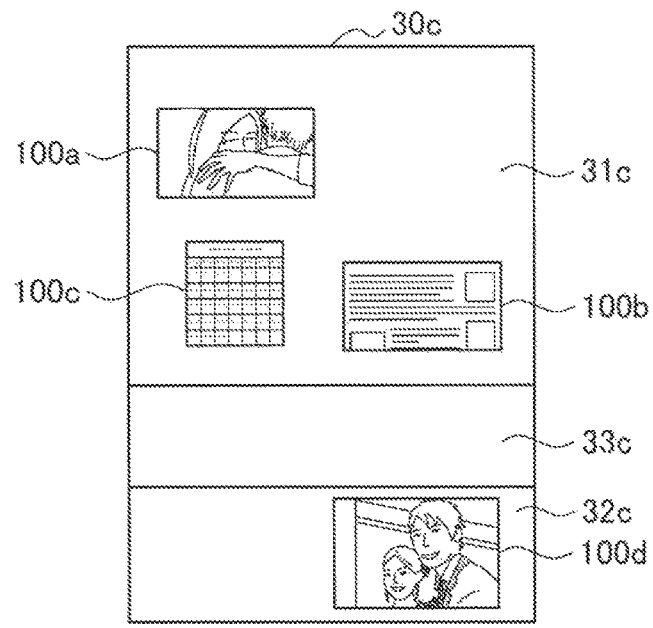
FIG. 18 is an explanatory diagram illustrating an example of a screen displayed by an information processing device.
Figure 19:
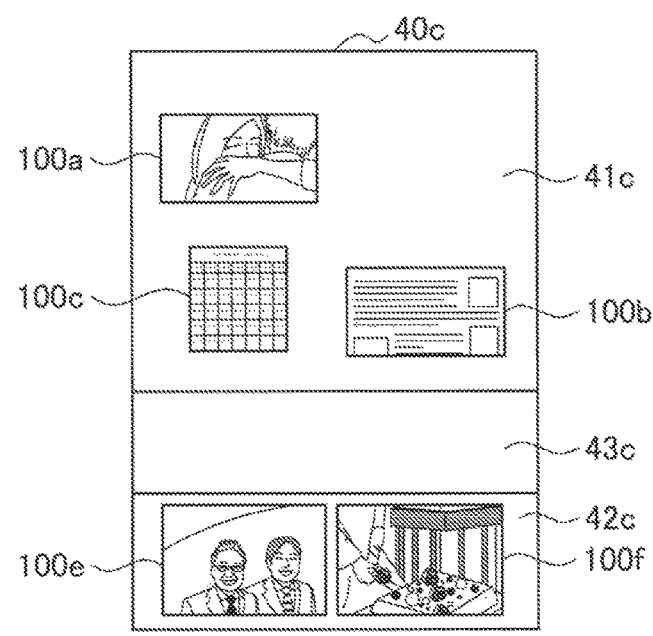
FIG. 19 is an explanatory diagram illustrating an example of a screen displayed by an information processing device.
Figure 20:
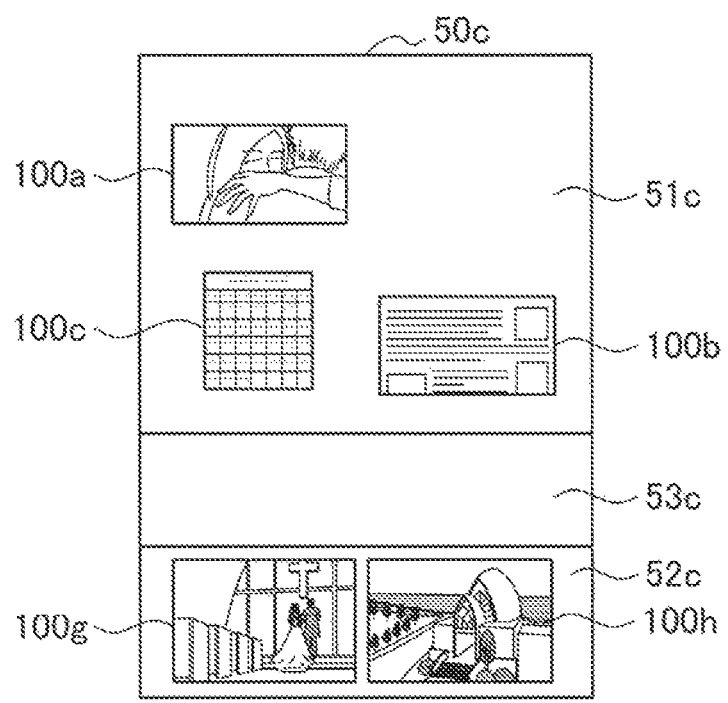
FIG. 20 is an explanatory diagram illustrating an example of a screen displayed by an information processing device.

For example, if the user A touches the image information 100c in the personal area 32c, and moves his or her fingertip to the inside of the shared area 31c (that is, moves in the direction of the arrow P), the information processing device 30 moves the image information 100c into the shared area 31c, as illustrated in FIG. 18. Furthermore, the information processing device 30 transmits information indicating the above to the server 20. The server 20 computes the display position of the image information 100c in the other information processing devices 40 to 60. The server 20 transmits information related to the display position to the other information processing devices 40 to 60. Based on this information, the other information processing devices 40 to 60 move the image information 100c to the shared areas 41c to 61c, as illustrated in FIG. 17 and FIGS. 19 to 20.

Additionally, the user A is also able to perform various input operations other than moving image information (such as changing the TV channel or scrolling a homepage (HP), for example) on the image information 100a to 100c in the shared area 31c. The information processing device 30 performs processing corresponding to such input operations on the image information 100a to 100c, and transmits information related to the input operations to the server 20. The server 20 transmits the information to the other information processing devices 40 to 60. The information processing devices 40 to 60 perform processing corresponding to the input operations on the image information 100a to 100c in the shared areas 41c to 61c.

Figure 21:
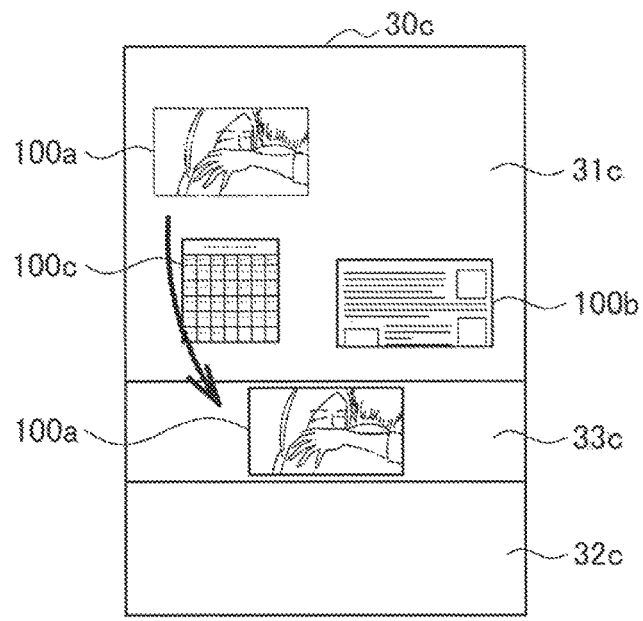
FIG. 21 is an explanatory diagram illustrating an example of a screen displayed by an information processing device.

Also, as illustrated in FIG. 21, if the user A touches the image information 100a in the shared area 31c, and moves his or her fingertip to the inside of the temporary saving area 33c, the information processing device 30 moves the image information 100c into the temporary saving area 33c. Furthermore, the information processing device 30 transmits information indicating the above to the server 20. The server 20 computes the display position of the image information 100c in the other information processing devices 40 to 60. The server 20 transmits information related to the display position to the other information processing devices 40 to 60, and based on this information, the other information processing devices 40 to 60 move the image information 100a in the shared areas 41c to 51c to the temporary saving areas 43c to 63c.

In this way, if there is a variation in the shared area and the temporary saving area of any information processing device, the server 20 causes the variation to be reflected in the shared areas and temporary saving areas of the other information processing devices. In other words, the server 20 synchronizes the image display applications executed by the information processing devices 30 to 70. Consequently, the server 20 enables the users A to D of the information processing devices 30 to 60 to share image information.

On the other hand, the server 20 is not involved with input operations performed in the personal areas 32c to 62c. Consequently, the users A to D are able to perform personal work using the personal areas 32c to 62c, and move information the user wants to share with the other users into the shared areas 31c to 61c or the temporary saving areas 33c to 63c. Obviously, the server 20 may also be involved with the processing of the personal areas 32c to 62c in some form.

Consequently, according to the information processing system 10 of the present embodiment, respective users are able to divide up work into respective tasks or work cooperatively while viewing multiple pieces of image information (task states) at the same time in parallel. Additionally, respective users are able to perform tasks graphically and dynamically.

(1-3. Configuration of Server)

Figure 2:
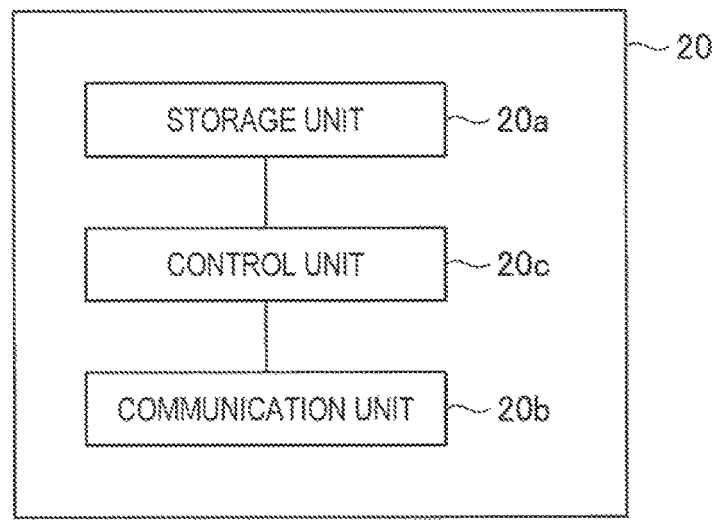
FIG. 2 is a block diagram illustrating an example of an information processing device.
Figure 3:
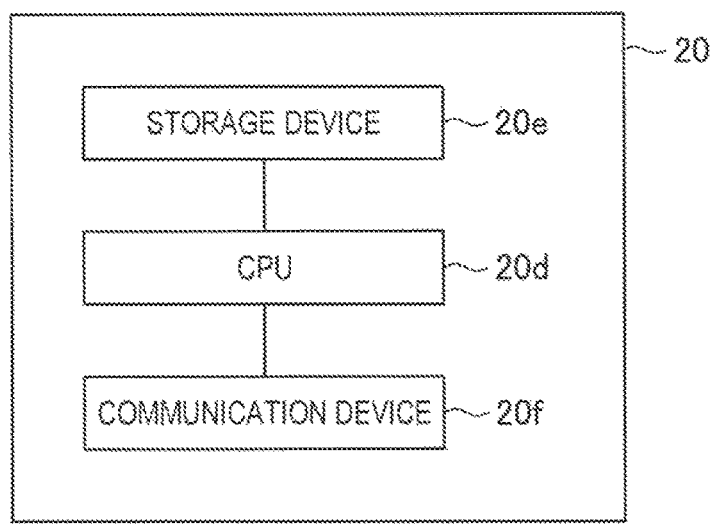
FIG. 3 is a hardware configuration diagram illustrating an example of an information processing device.

Next, a configuration of the server 20 will be described on the basis of FIGS. 2 and 3. The server 20 is equipped with a storage unit 20a, a communication unit 20b, and a control unit 20c. The storage unit 20a stores a program required for processing performed by the server 20, as well as information transmitted from the information processing devices 30 to 70. This information will be discussed later in detail. The communication unit 20b communicates with the information processing devices 30 to 70. The control unit 20c controls the respective structural elements of the server 20, and also performs a process of synchronizing the image display applications executed by the information processing devices 30 to 70.

As a hardware configuration, the server 20 is equipped with a Central Processing Unit (hereinafter referred to as CPU) 20d, a storage device 20e, and a communication device 20f. With these hardware components, the server 20 realizes the storage unit 20a, the communication unit 20b, and the control unit 20c discussed above. These hardware components are realized by electronic circuits and the like.

The CPU 20d loads a program stored in the storage device 20e, and executes the program. Consequently, the CPU 20d is the substantial agent of operation in the server 20. The storage device 20e is made up of ROM, RAM, a hard disk, non-volatile memory, and the like. The storage device 20e stores a program causing the server 20 to realize the storage unit 20a, the communication unit 20b, and the control unit 20c. The storage device 20e stores information transmitted from the information processing devices 30 to 70. The communication device 20f communicates with the information processing devices 30 to 70.

(1-4. Configuration of Information Processing Device)

Figure 4:
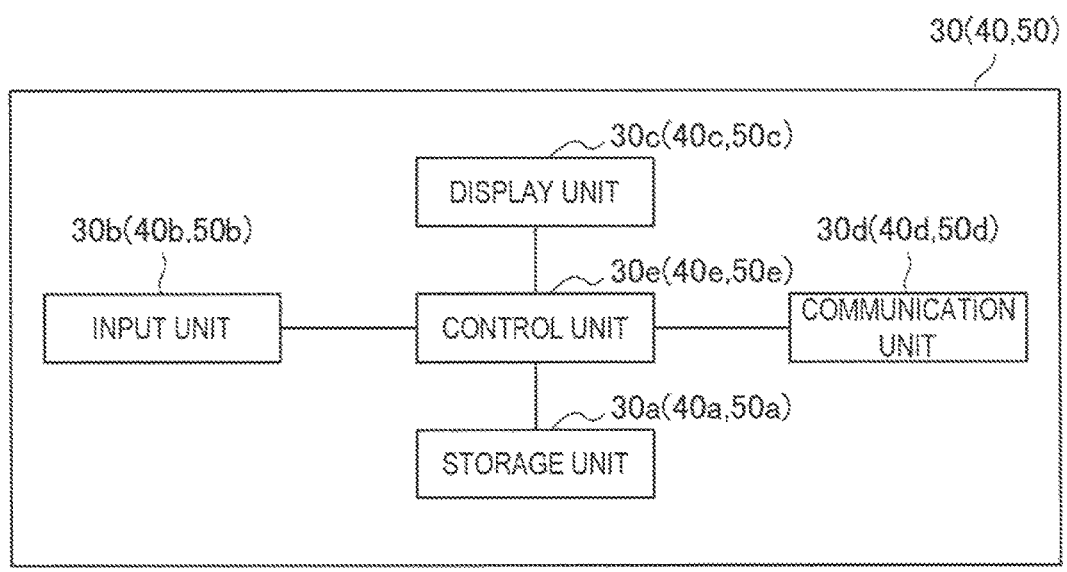
FIG. 4 is a block diagram illustrating an example of an information processing device.

Next, a configuration of the information processing devices 30 to 70 will be described on the basis of FIGS. 4 to 7. As illustrated in FIG. 4, the information processing device 30 is equipped with a storage unit 30a, an input unit 30b, a display unit 30c, a communication unit 30d, and a control unit 30e. The storage unit 30a stores a program required for processing performed by the information processing device 30, as well as various information. For example, as the above program, the storage unit 30a stores a program for executing an image display application. The type of image display application is not particularly limited, but preferably is one able to partition the display area of the display unit 30c into a shared area, a personal area, and a temporary saving area, and display image information in these display areas.

The storage unit 30a stores device identification information (such as an ID) for identifying the information processing device 30. In addition, the storage unit 30a stores display area information related to the display area. The display area information includes information such as the resolution (dpi) of the display area, the total number of pixels (such as the number of pixels along the long edge times the number of pixels along the short edge) in the display area, the aspect ratio of the display area, and the total number of pixels (such as the number of pixels along the long edge times the number of pixels along the short edge) in each area inside the display area, for example. In addition, an xy plane is defined for each area, and the storage unit 30a stores the xy coordinate value of each pixel and the partitioned area to which each pixel belongs in association with each other. For example, the x axis corresponds to the long edge, and the y axis corresponds to the short edge.

The input unit 30b accepts various input operations from the user, and is a touch panel, for example. The display unit 30c displays various images. The display area of the display unit 30c is partitioned into a shared area 31c, a personal area 32c, and a temporary saving area 33c, for example. Image information is displayed in each area. The type of image information is not particularly limited. The communication unit 30d communicates with the server 20 and the other information processing devices 40 to 70. The control unit 30e executes the image display application, and also controls the respective structural elements of the information processing device 30.

Figure 5:
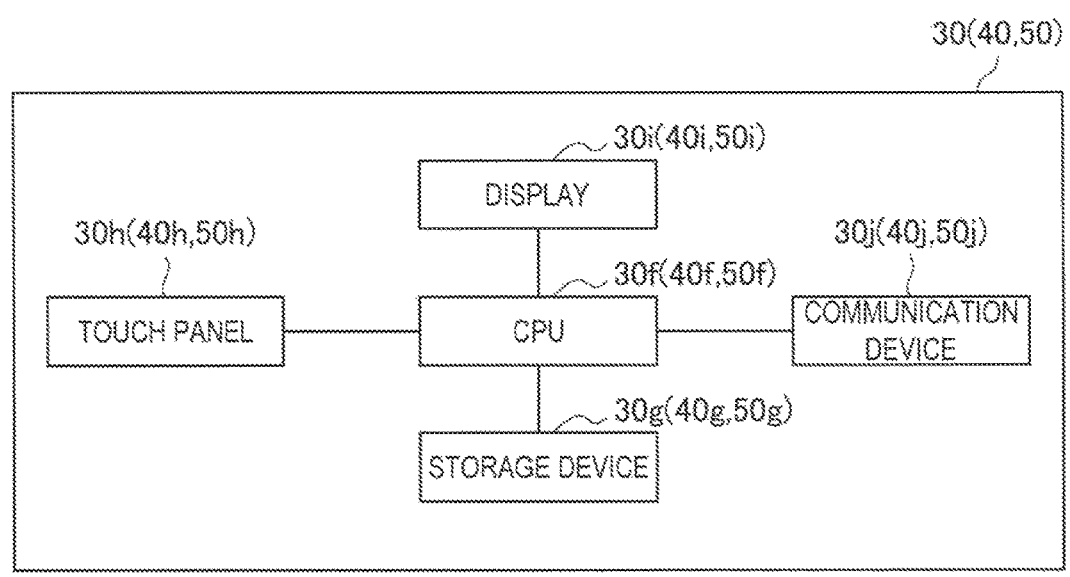
FIG. 5 is a hardware configuration diagram illustrating an example of an information processing device.

As illustrated in FIG. 5, as a hardware configuration, the information processing device 30 is equipped with a CPU 30f, a storage device 30g, a touch panel 30h, a display 30i, and a communication device 30j. With these hardware components, the information processing device 30 realizes the storage unit 30a, the input unit 30b, the display unit 30c, the communication unit 30d, and the control unit 30e discussed above. These hardware components are realized by electronic circuits and the like.

The CPU 30f loads a program stored in the storage device 30g, and executes the program. Consequently, the CPU 30f is the substantial agent of operation in the information processing device 30. The storage device 30g is made up of ROM, RAM, non-volatile memory, and the like. The storage device 30g stores a program causing the information processing device 30 to realize the storage unit 30a, the input unit 30b, the display unit 30c, the communication unit 30d, and the control unit 30e, as well as various information. This program includes a program for executing an image display application. As the various information, the storage device 30g stores the above-described device identification information, display area information, and the like. The storage device 30g is also used as a work area by the CPU 30f. The touch panel 30h is provided on the surface of the display 30i, and accepts input operations from the user. The display 30i displays various information, such as the image information discussed above, for example. In other words, the display area of the display 30i is partitioned into a shared area, a personal area, and a temporary saving area, and image information is displayed in each area. The communication device 30j communicates with the server 20 and the other information processing devices 40 to 70.

As illustrated in FIG. 4, the information processing device 40 is equipped with a storage unit 40a, an input unit 40b, a display unit 40c, a communication unit 40d, and a control unit 40e. Also, as illustrated in FIG. 5, as a hardware configuration, the information processing device 40 is equipped with a CPU 40f, a storage device 40g, a touch panel 40h, a display 40i, and a communication device 40j. Since these functions are similar to the information processing device 30, description will be omitted.

As illustrated in FIG. 4, the information processing device 50 is equipped with a storage unit 50a, an input unit 50b, a display unit 50c, a communication unit 50d, and a control unit 50e. Also, as illustrated in FIG. 5, as a hardware configuration, the information processing device 50 is equipped with a CPU 50f, a storage device 50g, a touch panel 50h, a display 50i, and a communication device 50j. Since these functions are similar to the information processing device 30, description will be omitted.

Figure 6:
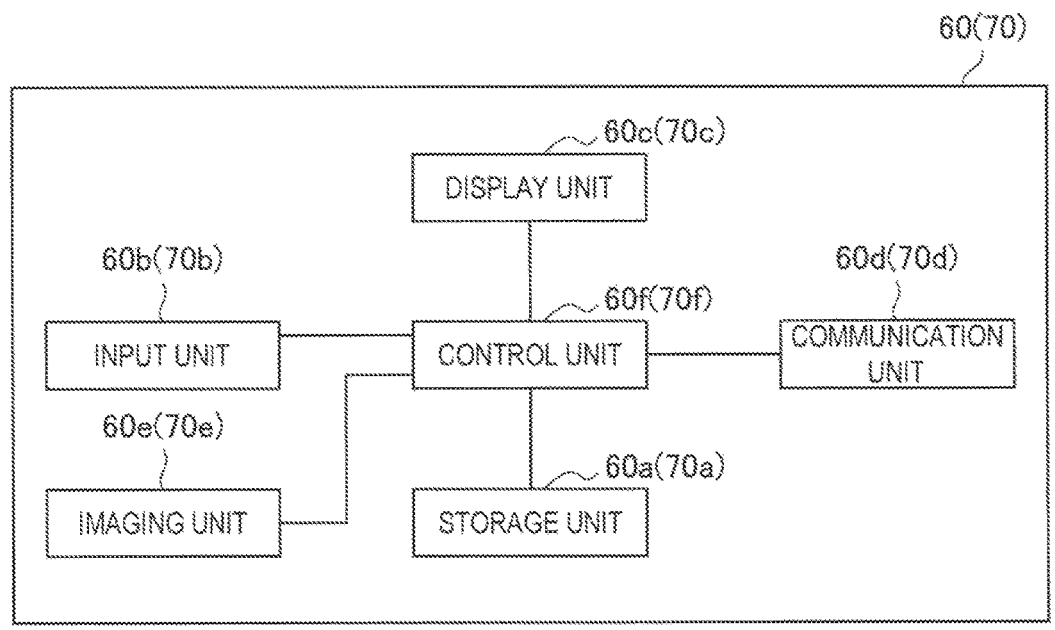
FIG. 6 is a block diagram illustrating an example of an information processing device.

As illustrated in FIG. 6, the information processing device 60 is equipped with a storage unit 60a, an input unit 60b, a display unit 60c, a communication unit 60d, an imaging unit 60e, and a control unit 60f. The storage unit 60a stores a program required for processing performed by the information processing device 60, as well as various information. For example, as the above program, the storage unit 60a stores a program for executing an image display application. The type of image display application is not particularly limited, but preferably is one able to partition the display area of the display unit 60c into a shared area, a personal area, and a temporary saving area, and display image information in each area.

The storage unit 60a stores device identification information (such as an ID) for identifying the information processing device 60. In addition, the storage unit 60a stores display area information related to the display area. The display area information includes information such as the resolution (dpi) of the display area, the total number of pixels (such as the number of pixels along the long edge times the number of pixels along the short edge) in the display area, the aspect ratio of the display area, and the total number of pixels (such as the number of pixels along the long edge times the number of pixels along the short edge) in each partitioned area, for example. In addition, an xy plane is defined for each area, and the storage unit 30a stores the xy coordinate value of each pixel and the partitioned area to which each pixel belongs in association with each other.

The input unit 60b accepts various input operations from the user, and is a touch panel, for example. The display unit 60c displays various images. The display area of the display unit 60c is partitioned into a shared area 61c, a personal area 62c, and a temporary saving area 63c, for example. Image information is displayed in each area. The type of image information is not particularly limited. The communication unit 60d communicates with the server 20 and the other information processing devices 40, 50, and 70. The imaging unit 60e acquires a captured image by imaging the area around the information processing device 60. The captured image is used for session formation, input operations (gesture operations, for example), and the like. The control unit 60f executes the image display application, and also controls the respective structural elements of the information processing device 60.

Figure 7:
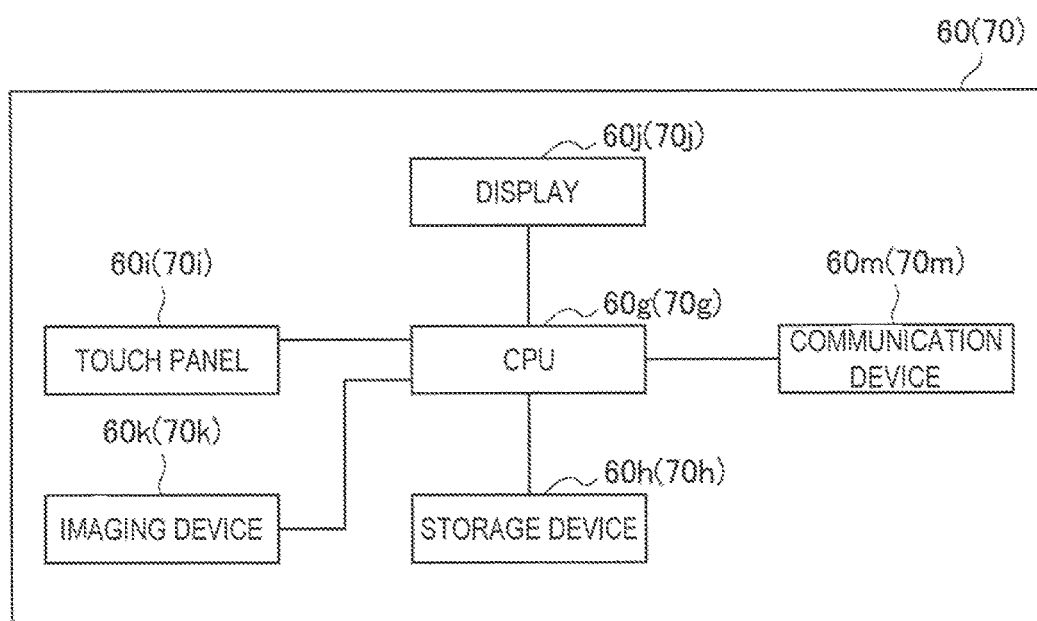
FIG. 7 is a hardware configuration diagram illustrating an example of an information processing device.

As illustrated in FIG. 7, as a hardware configuration, the information processing device 60 is equipped with a CPU 60g, a storage device 60h, a touch panel 60i, a display 60j, an imaging device 60k, and a communication device 60m. With these hardware components, the information processing device 30 realizes the storage unit 60a, the input unit 60b, the display unit 60c, the communication unit 60d, the imaging unit 60e, and the control unit 60f discussed above. These hardware components are realized by electronic circuits and the like.

The CPU 60g loads a program stored in the storage device 60h, and executes the program. Consequently, the CPU 60g is the substantial agent of operation in the information processing device 60. The storage device 60h is made up of ROM, RAM, a hard disk, non-volatile memory, and the like. The storage device 60h stores a program causing the information processing device 60 to realize the storage unit 60a, the input unit 60b, the display unit 60c, the communication unit 60d, the imaging unit 60e, and the control unit 60f, as well as various information. This program includes a program for executing an image display application. As the various information, the storage device 60h stores the above-described device identification information, display area information, and the like. The storage device 60h is also used as a work area by the CPU 60g. The touch panel 60i is provided on the surface of the display 60j, and accepts input operations from the user. The display 60j displays various information, such as the image information discussed above, for example. In other words, the display area of the display 60j is partitioned into a shared area, a personal area, and a temporary saving area, and image information is displayed in each area. The imaging device 60k acquires a captured image by imaging the area around the information processing device 60. The communication device 60m communicates with the server 20 and the other information processing devices 40, 50, and 70.

As illustrated in FIG. 6, the information processing device 70 is equipped with a storage unit 70*a*, an input unit 70*b*, a display unit 70*c*, a communication unit 70*d*, an imaging unit 70*e*, and a control unit 70*f*. Also, as illustrated in FIG. 7, as a hardware configuration, the information processing device 70 is equipped with a CPU 70*g*, a storage device 70*h*, a touch panel 70*i*, a display 70*j*, an imaging device 70*k*, and a communication device 70*m*. Since these functions are similar to the information processing device 60, description will be omitted.

<2. Process by Information Processing System>

Next, a processing sequence by the information processing system 1 will be described.

(2-1. Presupposed Process)

Figure 8:
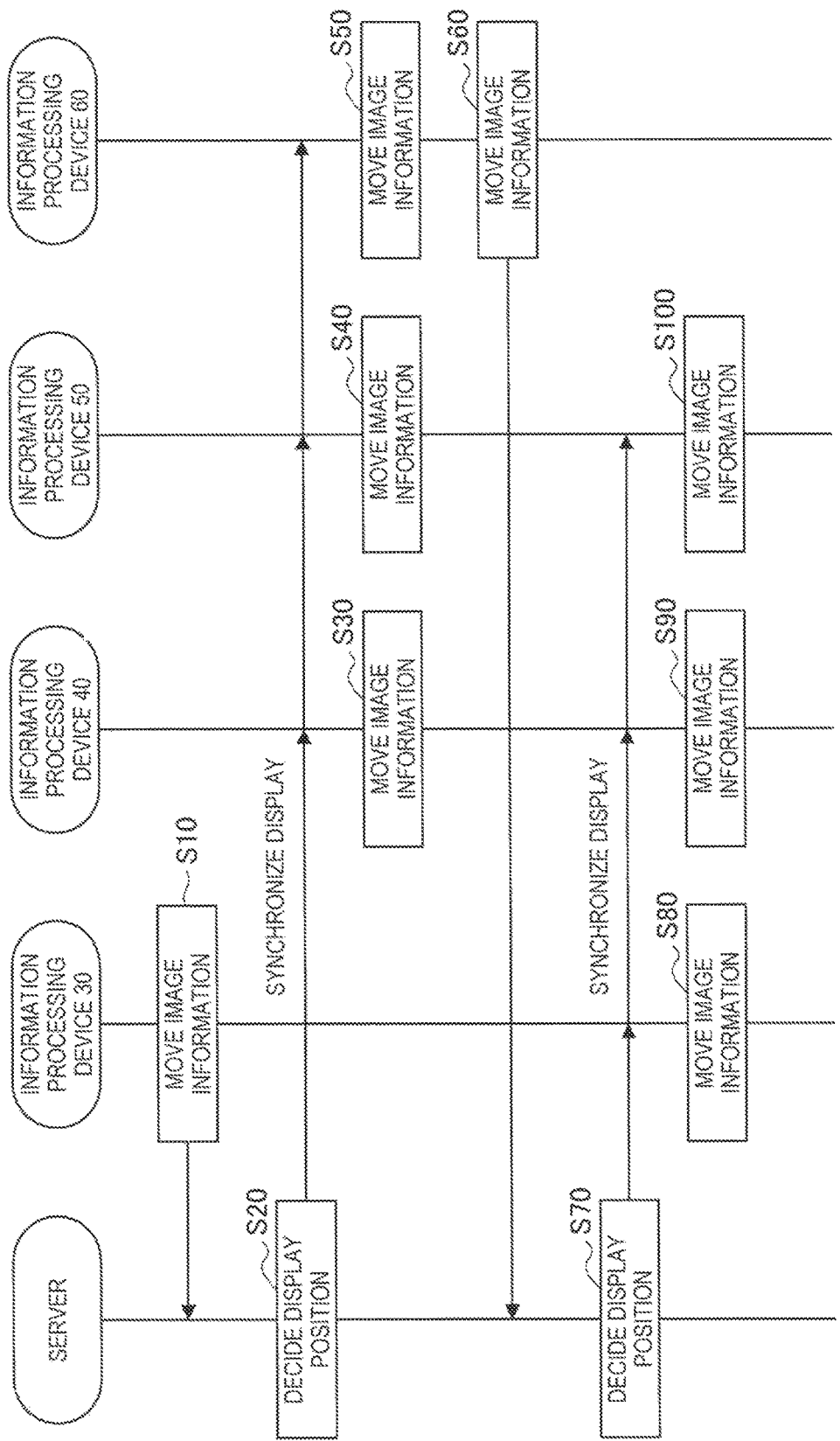
FIG. 8 is a flowchart illustrating a processing sequence by an information processing system.

The information processing system 10 conducts the following presupposed process prior to conducting the basic process illustrated in FIG. 8. Namely, the information processing system 10 first forms a session. The session formation method is not particularly limited. Hereinafter, a method of forming a session that includes the information processing device 60 will be described as an example of a session formation method.

For example, when the users A to C want to make the information processing devices 30 to 50 join a session, the users A to C input an indication of wanting to join into the information processing devices 30 to 50. Meanwhile, when the user D wants to make the information processing device 60 join a session, the user D inputs an indication of wanting to join into the information processing device 60. The input of information into the information processing device 60 is performed by a touch operation on the input unit 60*b* or by a gesture operation. The control unit 30*e* of the information processing device 30 outputs join request information indicating a request to join the session, device identification information, and display area information to the communication unit 30*d*, and the communication unit 30*d* transmits this information to the server 20. The other information processing devices 40 to 60 also perform similar processes.

The communication unit 20*b* of the server 20 receives the information, and outputs to the control unit 20*c*. Based on the information, the control unit 20*c* causes the information processing devices 30 to 60 to join the session. Furthermore, the control unit 20*c* stores the information in the storage unit 20*a*. Note that it is not necessary for all of the users A to D to be near the information processing device 60. Hereinafter, a process of the information processing system 10 will be described under the presupposition that the information processing devices 30 to 60 form a single session, and the users A to D are present near the information processing device 60.

The control units 30*e* to 60*f* of the information processing devices 30 to 60 independently launch image display applications. Subsequently, as illustrated in FIGS. 13 to 16, the control units 30*e* to 60*f* partition the display areas of the display units 30*c* to 60*c* into the shared areas 31*c* to 61*c*, the personal areas 32*c* to 62*c*, and the temporary saving areas 33*c* to 63*c*, respectively. Note that the layout of each area illustrated in FIGS. 13 to 16 is an example, and obviously other layouts are also acceptable. Additionally, since the display areas of the information processing devices 30 to 50 are narrower than the display area of the information processing device 60, the information processing devices 30 to 50 may also display the respective areas in tabbed form (see FIGS. 22 to 25).

The shared areas 32*c* to 62*c* are areas in which image information is shared by the users A to D. In the shared areas 32*c* to 62*c*, the same image information is displayed. The display positions of respective image information are nearly the same among the shared areas 32*c* to 62*c*. The display positions may also be different among the shared areas 32*c* to 62*c*.

The temporary saving areas 33*c* to 63*c* are also areas in which image information is shared by the users A to D, but these areas are areas that temporarily save image information. Consequently, the control units 30*e* to 60*f* temporarily save image information in the temporary saving areas 33*c* to 63*c* (for example, save image information in the storage units 30*a* to 60*a*), but may also not display this image information. In addition, the control units 30*e* to 60*f* may also display the temporary saving areas 33*c* to 63*c* at reduced size. In this case, the control units 30*e* to 60*f* may enlarge the temporary saving areas 33*c* to 63*c* when a user selects the temporary saving areas 33*c* to 63*c* (for example, when a user touches the temporary saving areas 33*c* to 63*c*). In the case of enlarging the temporary saving areas 33*c* to 63*c*, the control units 30*e* to 60*f* may also display image information in the temporary saving areas 33*c* to 63*c*. Additionally, the control units 30*e* to 60*f* may also display image information in the temporary saving areas 33*c* to 63*c* on only the information processing device of the user who is performing a task on that image information.

The personal areas 32*c* to 63*c* are areas unique to the users of the information processing devices 30 to 60, and the image information displayed in the personal areas 32*c* to 62*c* is not shared among the users A to D. In other words, the image information displayed in the personal area 32*c* of the information processing device 30, for example, is image information unique to the user A, and is not displayed on the other information processing devices 40 to 60.

In addition, the control units 30*e* to 60*f* arrange image information in the personal areas 32*c* to 62*c* on the basis of input operations from the users. The image information may be information that already exists in the storage units 30*a* to 50*a* and 60*a*, or information that exists on the network 80.

At this point, the users A to C use the input units 30*b* to 50*b* which are touch panels to perform input operations on the information processing devices 30 to 50. Also, the users A to D use the input unit 60*b* which is a touch panel to perform input operations on the information processing device 60. The users A to D may also perform input operations by gesture operations. After that, the information processing system 10 conducts the basic process illustrated in FIG. 8 to enable the sharing of image information among the users A to D. Note that in the basic process illustrated in FIG. 8, the information processing devices 30 and 60 move image information, but obviously a similar process is conducted in the case in which the other information processing devices 40 and 50 move image information.

(2-2. Basic Process)

Next, the sequence of the basic process conducted by the information processing system 10 will be described on the basis of FIG. 8. In step S10, the user A performs an input operation of moving any image information displayed in the display area of the information processing device 30. For example, the user A touches image information displayed in the display area, and drags the image information to a desired display position. Specifically, if the user A wants to move image information displayed in the personal area 32*c* to the shared area 31*c*, the user A touches the relevant image information, and drags his or her finger to a desired display position inside the shared area 31*c*. Also, if the user A wants to move image information displayed in the personal area 32*c* to the temporary saving area 33*c*, the user A touches the relevant image information, and drags his or her finger to a desired display position inside the temporary saving area 33*c*.

The control unit 30*e* of the information processing device 30 moves the image information on the basis of the input operation. If the movement destination of the image information is the shared area 31*c* or the temporary saving area 33*c*, the control unit 30*e* conducts the following process. Namely, the control unit 30*e* generates movement notification information related to the image information to be moved, the partitioned area to which the image information belongs after being moved, and the display position of the image information after being moved. Subsequently, the control unit 30*e* outputs device identification information and movement notification information to the communication unit 30*d*. Hereinafter, the image information to be moved will also be designated the "moved image information". Also, the partitioned area to which the image information belongs after being moved will also be designated the "post-movement partitioned area". Also, the display position of the image information after being moved will also be designated the "post-movement display position". The display position is expressed by xy coordinate values. The communication unit 30*d* transmits the movement notification information and the device identification information to the server 20. Note that the control unit 30*e* may also not generate such movement notification information as long as the image information is moved inside the personal area 32*c*. Additionally, instead of transmitting the image information, the control unit 30*e* may transmit information indicating the location of the image information (for example, a URL) to the server 20.

In step S20, the communication unit 20*b* of the server 20 receives the device identification information and the movement notification information, and outputs to the control unit 20*c*. On the basis of the device identification information, the control unit 20*c* identifies the transmission source of the movement notification information (in this case, the information processing device 30). Subsequently, the control unit 20*c* searches for a session that includes the transmission source of the movement notification information. Furthermore, the control unit 20*c* identifies the other information processing devices (in this case, the information processing devices 40 to 60) constituting the session.

Subsequently, the control unit 20*c* conducts the following process on the basis of the movement notification information and display area information for the other information processing devices. First, the control unit 20*c* treats the post-movement partitioned areas on the other information processing devices (hereinafter also designated the "destination partitioned areas") as being the same partitioned area as the post-movement partitioned area indicated by the movement notification information (hereinafter also designated the "source partitioned area"). Furthermore, the control unit 20*c* decides the post-movement display positions on the other information processing devices (hereinafter also designated the "destination display positions"), on the basis of the post-movement display position indicated by the movement notification information (hereinafter also designated the "source display position"), and the display area information for the other information processing devices.

For example, if the total number of pixels in the source partitioned area and the total number of pixels in the destination partitioned areas are the same, the control unit 20*c* treats the source display position as being the same position as the destination display positions. On the other hand, if the total number of pixels in the source partitioned area and the total number of pixels in the destination partitioned areas are different, the control unit 20*c* decides the post-movement display positions for the other information processing devices on the basis of factors such as the aspect ratios of these partitioned areas. For example, if the long edge of the destination partitioned area has twice as many pixels as the long edge of the source partitioned area, the control unit 20*c* treats the x coordinate value of the destination display position as being twice the value of the x coordinate value of the source display position. The control unit 20*c* decides the destination partitioned area and the destination display position for each of the other information processing devices.

Subsequently, the control unit 20*c* generates movement notification information related to the image information to be moved, the destination partitioned areas, and the destination display positions, and outputs to the communication unit 20*b*. The communication unit 20*b* transmits the movement notification information to the other information processing devices (in this case, the information processing devices 40 to 60). In steps S30 to S60, the communication units 40*d* to 60*d* of the other information processing devices 40 to 60 receive the movement notification information, and output to the control units 40*e* to 60*f*. The control units 40*e* to 60*f* display the image information indicated by the movement notification information in the partitioned area and at the display position indicated by the movement notification information. Consequently, if there is a variation in the shared area and the temporary saving area of the information processing device 30, the server 20 causes the variation to be reflected in the shared areas 41*c* to 61*c* and the temporary saving areas 43*c* to 63*c* of the other information processing devices 40 to 60.

In step S60, the user D performs an input operation of moving one of the pieces of image information displayed in the display area of the information processing device 60. For example, the user D touches image information displayed in the display area, and drags the image information to a desired display position. The user D may also point with a fingertip to image information displayed in the display area, and transfer the fingertip until a line extending from the fingertip reaches the desired display position. In other words, the user D may also perform an input operation by a gesture operation. An example of the line of extension is illustrated in FIG. 13. In FIG. 13, the line 500 extending from the fingertip of the user D is pointing at the image information 100*b*. Another example of a gesture operation is an operation such as waving one's hand.

The control unit 60*f* of the information processing device 60 moves the image information on the basis of the input operation. After that, the control unit 60*f* generates movement notification information by performing a process similar to step S10. After that, the control unit 60*f* outputs device identification information and movement notification information to the communication unit 60*d*. The communication unit 60*d* transmits the movement notification information and the device identification information to the server 20. Note that the control unit 60*f* may also not generate such movement notification information as long as the image information is moved inside the personal area 62*c*.

In step S70, the communication unit 20*b* of the server 20 receives the device identification information and the movement notification information, and outputs to the control unit 20*c*. On the basis of the device identification information, the control unit 20*c* identifies the transmission source of the movement notification information (in this case, the information processing device 60). Subsequently, the control unit 20c searches for a session including the transmission source of the movement notification information. Furthermore, the control unit 20c identifies the other information processing devices (in this case, the information processing devices 30 to 50) constituting the session.

Subsequently, the control unit 20c conducts a process similar to step S20, on the basis of the movement notification information and display area information for the other information processing devices. Subsequently, the control unit 20c generates movement notification information related to the image information to be moved, the destination partitioned areas, and the destination display positions, and outputs to the communication unit 20b. The communication unit 20b transmits the movement notification information to the other information processing devices (in this case, the information processing devices 30 to 50).

In steps S80 to S100, the other information processing devices 30 to 50 display the image information indicated by the movement notification information in the partitioned area and at the display position indicated by the movement notification information. Consequently, if there is a variation in the shared area and the temporary saving area of the information processing device 60, the server 20 causes the variation to be reflected in the shared areas 31c to 51c and the temporary saving areas 33c to 53c of the other information processing devices 30 to 60.

A specific example of the basic process will be described on the basis of FIGS. 13 to 20. As illustrated in FIGS. 13 to 16, at a certain point in time, image information 100a and 100b is being displayed in the shared areas 31c to 61c. Also, image information 100c and 100d is displayed in the individual area 32c, while image information 100e and 100f is displayed in the individual area 42c. Also, image information 100g and 100h is displayed in the individual area 52c, while image information 100i and 100j is displayed in the individual area 62c.

If the user A touches the image information 100c in the individual area 32c, and moves his or her finger to the inside of the shared area 31c (that is, moves in the direction of the arrow P), the control unit 30e of the information processing device 30 moves the image information 100c into the shared area 31c, as illustrated in FIG. 18. Consequently, the moved image information becomes the image information 100c, and the post-movement partitioned area becomes the shared area 31c. Also, the post-movement display position becomes some position inside the shared area 31c. Consequently, the control unit 30e generates movement notification information related to the above information. Subsequently, the control unit 30e outputs device identification information and movement notification information to the communication unit 30d. The communication unit 30d transmits the movement notification information and the device identification information to the server 20.

The communication unit 20b of the server 20 receives the device identification information and the movement notification information, and outputs to the control unit 20c. On the basis of the device identification information, the control unit 20c identifies the transmission source of the movement notification information (in this case, the information processing device 30). Subsequently, the control unit 20c searches for a session including the transmission source of the movement notification information. Furthermore, the control unit 20c identifies the other information processing devices (in this case, the information processing devices 40 to 60) constituting the session.

Subsequently, the control unit 20c conducts the following process on the basis of the movement notification information and display area information for the other information processing devices. First, the control unit 20c decides that the destination partitioned area is the shared area. Furthermore, the control unit 20c decides the destination display position, on the basis of the source display position and the display area information for the other information processing devices 40 to 60. The control unit 20c decides the destination partitioned area and the destination display position for each of the other information processing devices.

Subsequently, the control unit 20c generates movement notification information related to the image information to be moved, the destination partitioned areas, and the destination display positions, and outputs to the communication unit 20b. The communication unit 20b transmits the movement notification information to the other information processing devices (in this case, the information processing devices 40 to 60). As illustrated in FIGS. 17, 19, and 20, the other information processing devices 40 to 60 display the image information 100c indicated by the movement notification information in the shared areas 41c to 61c.

After that, the users A to D perform desired tasks. For example, the users A to D may use the image information displayed in the personal areas 32c to 62c to perform user-specific tasks, or use the image information in the shared areas 31c to 61c to perform tasks in cooperation with other users. The tasks performed in the shared areas 31c to 61 c are also shared among the information processing devices 30 to 60, or in other words, among the users A to D.

For example, the control unit 30e of the information processing device 30 generates task information related to a task (in other words, an input operation) that the user A performs on image information in the shared area 31c. The control unit 30e transmits the task information and device identification information to the communication unit 30d. The communication unit 30d transmits the task information and the device identification information to the server 20. The communication unit 20b of the server 20 transmits the task information and the device identification information to the control unit 20c.

On the basis of the device identification information, the control unit 20c identifies the transmission source of the movement notification information (in this case, the information processing device 30). Subsequently, the control unit 20c searches for a session including the transmission source of the movement notification information. Furthermore, the control unit 20c identifies the other information processing devices (in this case, the information processing devices 40 to 60) constituting the session. Subsequently, the control unit 20c transmits the task information to the communication unit 20b, and the communication unit 20b transmits the task information to the other information processing devices 40 to 60. The communication units 40d to 60d of the other information processing devices 40 to 60 receive the task information, and output to the control units 40e to 60f. On the basis of the task information, the control units 40e to 60f update the image information in the shared areas 41c to 61c. Consequently, task states are also shared among the users A to D.

If tasks performed by multiple users are conflicting with each other for the same image information, the control unit 20c may also apply one of the tasks to the image information. For example, user priority levels may be preset, and if a task conflict occurs, the control unit 20c may apply the task by the user with the higher priority level to the image information. Additionally, the control unit 20c may also apply the task performed earlier to the image information. Additionally, the control unit 20c may also apply the owner's task to the image information. Herein, the owner of image information means the user having usage rights to that image information, or the user who moved that image information from his or her personal area to the shared area. Details will be discussed later. Additionally, the control unit 20c may also apply the task with the greater amount of operation to the image information.

In addition, if image information desired to be temporarily saved exists among the image information in the personal areas 32c to 62c or the shared areas 31c to 61 c, the users A to D may also move that image information to the temporary saving areas 33c to 63c. Consequently, temporarily saved image information is also shared among the users A to D.
(2-3. Example Display by Information Processing Device)

As discussed above, the information processing devices 30 to 60 partition the display area into three partitioned areas. Since the information processing device 60 is a big screen display, even if the display area is partitioned into three partitioned areas, each partitioned area is likely to have ample dimensions. However, since the information processing devices 30 to 50 are compact information processing devices carried by the users, the actual dimensions of the display area are small compared to the information processing device 60. Consequently, on the information processing devices 30 to 50, there is a possibility of reduced visibility in each partitioned area. Accordingly, by displaying the respective partitioned areas in tabbed form, the actual dimensions of the partitioned areas may be made larger. A specific example will be described on the basis of FIGS. 22 to 25.

Figure 22:
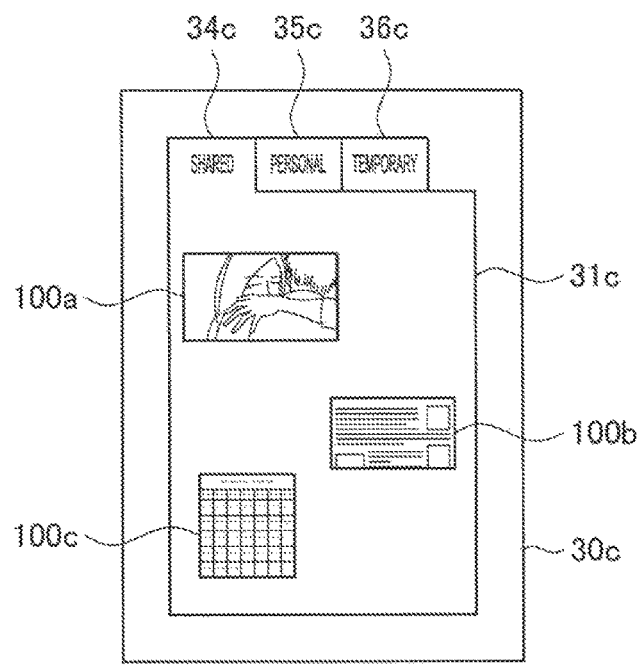
FIG. 22 is an explanatory diagram illustrating an example of a screen displayed by an information processing device.

As illustrated in FIG. 22, the control unit 30e of the information processing device 30 may display partition display tabs 34c to 36c indicating the types of partitioned areas, and display the partitioned area corresponding to the tab selected by the user. In the example illustrated in FIG. 22, the tab 34c is selected, and thus the control unit 30e displays the shared area 31c.

Figure 23:
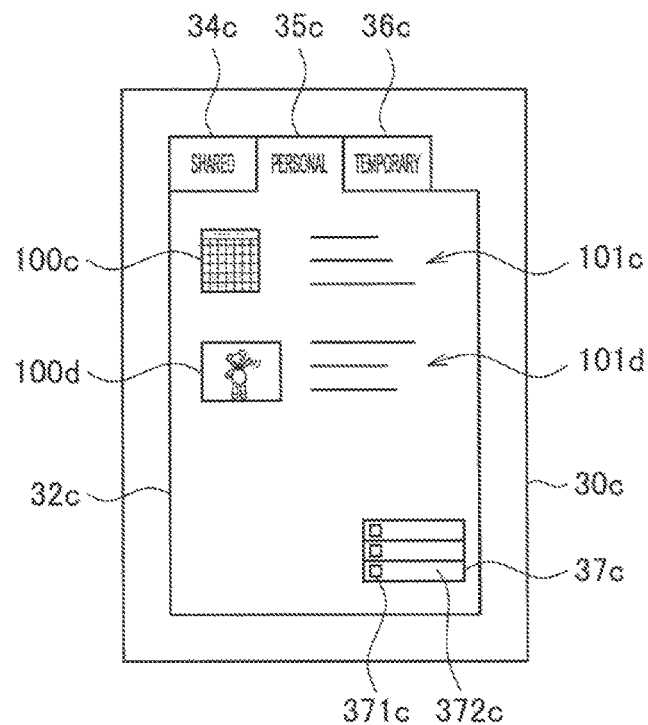
FIG. 23 is an explanatory diagram illustrating an example of a screen displayed by an information processing device.
Figure 24:
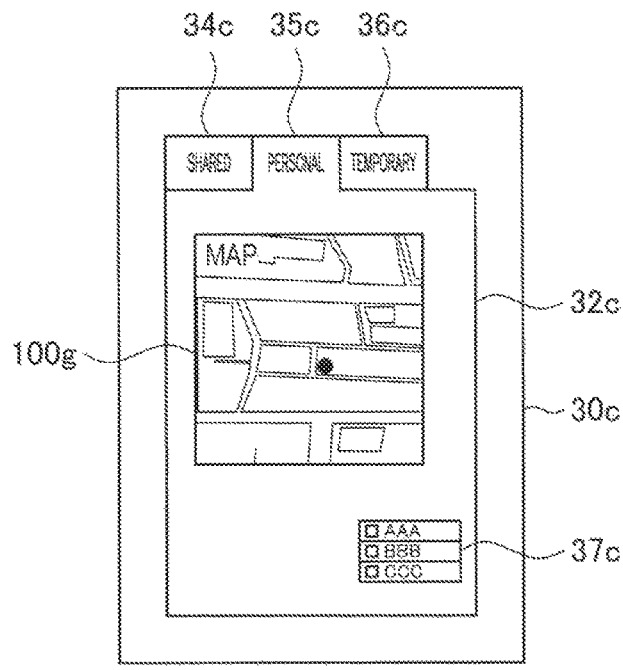
FIG. 24 is an explanatory diagram illustrating an example of a screen displayed by an information processing device.

FIG. 23 illustrates how the personal area 32c is displayed. In this example, the control unit 30e displays, in the personal area 32c, the image information 100c and 100d, as well as text information 101c and 101d summarizing the image information 100c and 100d. Additionally, the control unit 30e displays a selection list 37c. The selection list 37c includes checkboxes 371c and summary display fields 372c. The control unit 30e checks or clears the checkboxes 371c according to input operations by the user (for example, an operation of touching a checkbox 371c). In the summary display fields 372c, summaries of image information are displayed. The user A touches desired image information from among image information such as the image information 100c and 100d displayed in the personal area 32c, and moves his or her fingertip to the selection list 37c. In response, the control unit 30e registers the image information in the selection list 37c. Specifically, the control unit 30e displays a summary of the image information in a summary display field 372c of the selection list 37c. FIG. 24 illustrates another example of image information displayed in the personal area 32c. The image information 100g illustrated in this example is what is known as map information.

Figure 25:
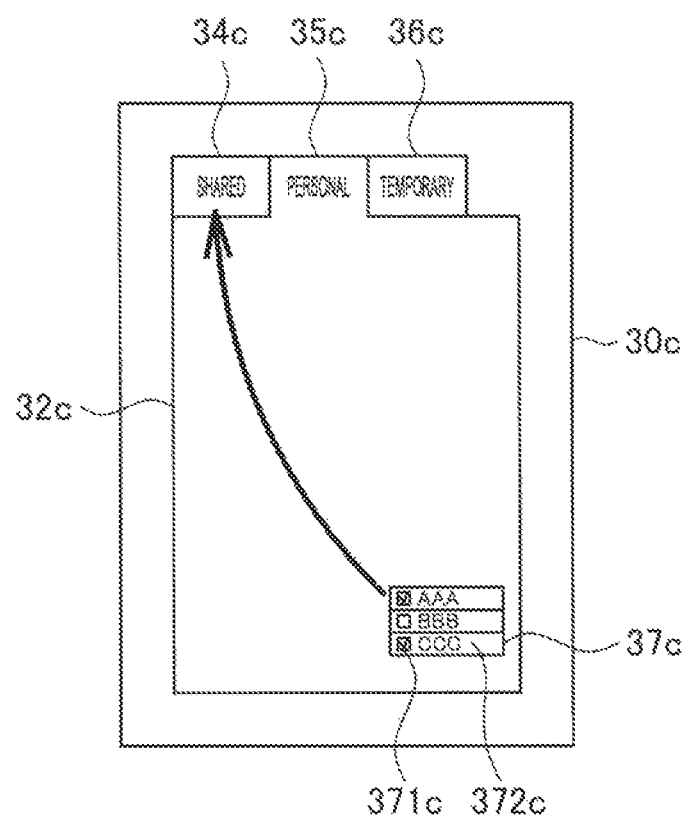
FIG. 25 is an explanatory diagram illustrating an example of a screen displayed by an information processing device.

The user A touches the checkbox 371c corresponding to desired image information from among the image information registered in the selection list 37c. In response, the control unit 30e checks the checkbox 371c. Subsequently, as illustrated in FIG. 25, the user A touches the selection list 37c, and move his or her fingertip to the shared tab 34c. In response, the control unit 30e moves the image information having a checked checkbox 371c to the shared area 31c.

After that, the information processing system 10 conducts the processing in the above step S20 and thereafter.
(2-4. Display Size Adjustment Process)

Figure 9:
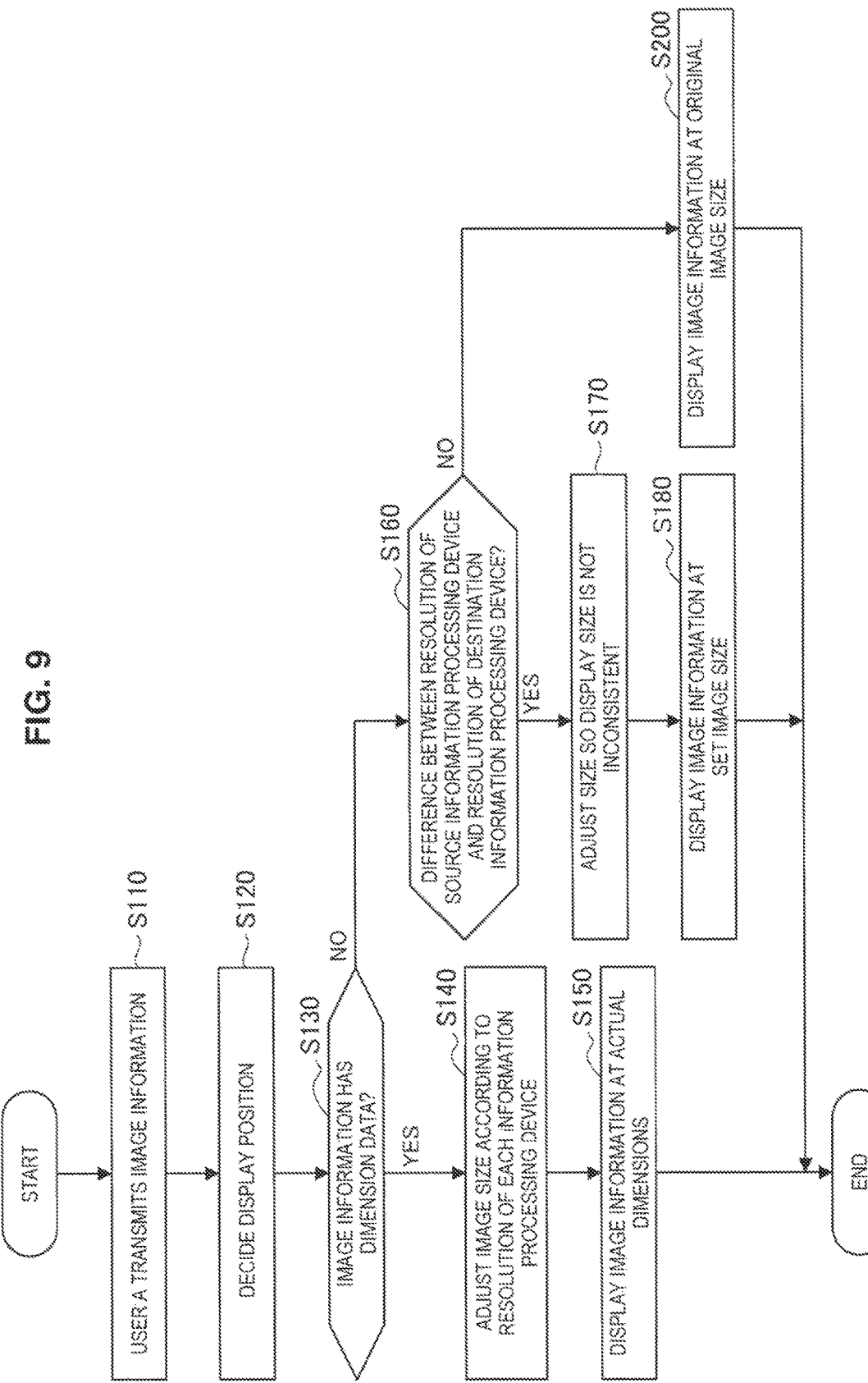
FIG. 9 is a flowchart illustrating a processing sequence by an information processing system.

Next, a display size adjustment process will be described on the basis of FIG. 9. As discussed above, in the present embodiment, when a certain information processing device moves image information to the shared area, that image information is also displayed in the shared areas of the other information processing devices. Consequently, if the resolution differs between information processing devices, the following phenomena may occur. For example, suppose that the resolution of the information processing device 30 is lower than the resolution of the information processing device 40. In this case, even if the same image information is displayed at the same display size (actual dimensions on the display area) on these information processing devices 30 and 40, the image sizes (total numbers of pixels) of the image information will be different. In other words, the image size of the image information displayed by the information processing device 30 is smaller than the image size of the image information displayed by the information processing device 40. Consequently, if the server 20 transmits image information transmitted from these information processing devices 30 and 40 to the other information processing devices 50 and 60 as-is, the other information processing devices 50 and 60 will display image information with different display sizes according to the resolutions of the information processing devices 30 and 40. In this case, the users may feel that the image information does not look right. Accordingly, in the present embodiment, by conducting a display size adjustment process, the display size of image information is homogenized, regardless of the resolution of the transmission source of the image information. Hereinafter, the content of the display size adjustment process will be described. Note that the following describes a process for when the information processing device 30 transmits image information to the server 20.

In step S110, the user A performs an input operation of moving one of the pieces of image information displayed in the display area of the information processing device 30 to the shared area 31c. The control unit 30e moves the image information to the shared area 31c on the basis of the input operation. Additionally, the control unit 30e associates dimension information with the image information. Dimension information is information indicating the actual dimensions of the object drawn by the moved image information. Dimension information may be stored in the storage unit 30a in advance, or acquired over the network 80. The control unit 30e generates movement notification information related to the moved image information, the post-movement partitioned area, and the post-movement display position. The specific processing details are as discussed earlier. Subsequently, the control unit 30e outputs device identification information and movement notification information to the communication unit 30d. The communication unit 30d transmits the movement notification information and the device identification information to the server 20.

In step S120, the communication unit 20b of the server 20 receives the device identification information and the movement notification information, and outputs to the control unit 20c. On the basis of the device identification information, the control unit 20c identifies the transmission source of the movement notification information (in this case, the information processing device 30). Subsequently, the control unit 20c searches for a session including the transmission source of the movement notification information. Furthermore, the control unit 20c identifies the other information processing devices 40 to 60 constituting the session.

Additionally, the control unit 20c decides the destination partitioned area and destination display position, on the basis of the movement notification information and the display area information for the other information processing devices 40 to 60. The specific processing details are as discussed earlier.

In step S130, the control unit 20c determines whether or not the moved image information has (is associated with) dimension information. In the case of determining that dimension information is associated with the moved image information, the control unit 20c proceeds to step S140. In the case of determining that dimension information is not associated with the moved image information, the control unit 20c proceeds to step S160.

In step S140, the control unit 20c adjusts the image size of the moved image information on the basis of the dimension information and the resolutions of the other information processing devices 40 to 60. Specifically, the control unit 20c adjusts the image size of the moved image information so that the image information is displayed at the actual dimensions on the other information processing devices 40 to 60. Subsequently, the control unit 20c generates movement notification information related to the moved image information, the destination partitioned areas, and the destination display positions, and outputs to the communication unit 20b. The communication unit 20b transmits the movement notification information to the other information processing devices 40 to 60.

In step S150, the other information processing devices 30 to 60 display the image information indicated by the movement notification information in the partitioned area and at the display position indicated by the movement notification information. Consequently, the other information processing devices 40 to 60 display the moved image information at the actual dimensions. In other words, the other information processing devices 40 to 60 are able to display the moved image information at a fixed display size, regardless of the resolution of the transmission source of the moved image information (in this case, the information processing device 30). Note that the other information processing devices 40 to 60 may not only display the moved image information as-is, but also display a three-dimensional space in the display area, and display the moved image information at some position within the three-dimensional space. For example, if moved image information with a large image size is displayed as-is, the majority of the display area may be occupied by the moved image information in some cases. In such cases, the other information processing devices 40 to 60 may also display the moved image information deeper into the screen in the three-dimensional space. In this case, the moved image information is reduced by being multiplied by a certain coefficient (reduction factor). After that, the information processing system 10 ends the process.

In step S160, the control unit 20c determines whether or not there is a difference between the resolution of the transmission source information processing device 30 and the resolutions of the other information processing devices 40 to 60. In the case of determining that there is a difference between these resolutions, the control unit 20c proceeds to step S170. In the case of determining these resolutions are the same, the control unit 20c proceeds to step S200. In other words, among the other information processing devices 40 to 60, the control unit 20c conducts the processing in step S170 and thereafter for those having a different resolution, and conducts the processing in step S200 for those having the same resolution.

In step S170, the control unit 20c adjusts the image size of the moved image information so that the display size of the moved image information displayed by the other information processing devices 40 to 60 does not become inconsistent due to the resolution of the information processing device 30. For example, the control unit 20c sets a standard image size for each type of object drawn by the moved image information and the resolutions of the other information processing devices 40 to 60. Subsequently, the control unit 20c sets the image size of the moved image information to the standard image size corresponding to the resolutions of the other information processing devices 40 to 60 and the object drawn by the moved image information. Subsequently, the control unit 20c generates movement notification information related to the moved image information, the destination partitioned areas, and the destination display positions, and outputs to the communication unit 20b. The communication unit 20b transmits the movement notification information to the other information processing devices 40 to 60.

In step S180, the other information processing devices 30 to 60 display the image information indicated by the movement notification information in the partitioned area and at the display position indicated by the movement notification information. Consequently, the other information processing devices 40 to 60 display the moved image information at standard image sizes. In other words, the other information processing devices 40 to 60 are able to display the moved image information at a fixed display size, regardless of the resolution of the transmission source of the moved image information (in this case, the information processing device 30). Note that the other information processing devices 40 to 60 may not only display the moved image information as-is, but also display a three-dimensional space in the display area, and display the moved image information at some position within the three-dimensional space. After that, the information processing system 10 ends the process.

In step S200, the control unit 20c continues the process without changing the image size of the moved image information. In other words, the control unit 20c generates movement notification information related to the moved image information, the destination partitioned areas, and the destination display positions, and outputs to the communication unit 20b. The communication unit 20b transmits the movement notification information to the other information processing devices 40 to 60. The other information processing devices 30 to 60 display the image information indicated by the movement notification information in the partitioned area and at the display position indicated by the movement notification information. At this point, the other information processing devices 40 to 60 may also multiply the image size of the moved image information by a certain coefficient, and display the moved image information at the image size obtained by this multiplication. After that, the information processing system 10 ends the process. The information processing devices 30 to 60 may also adjust the coefficient and the standard image size discussed above according to an input operation by the user or the like.

Figure 26:
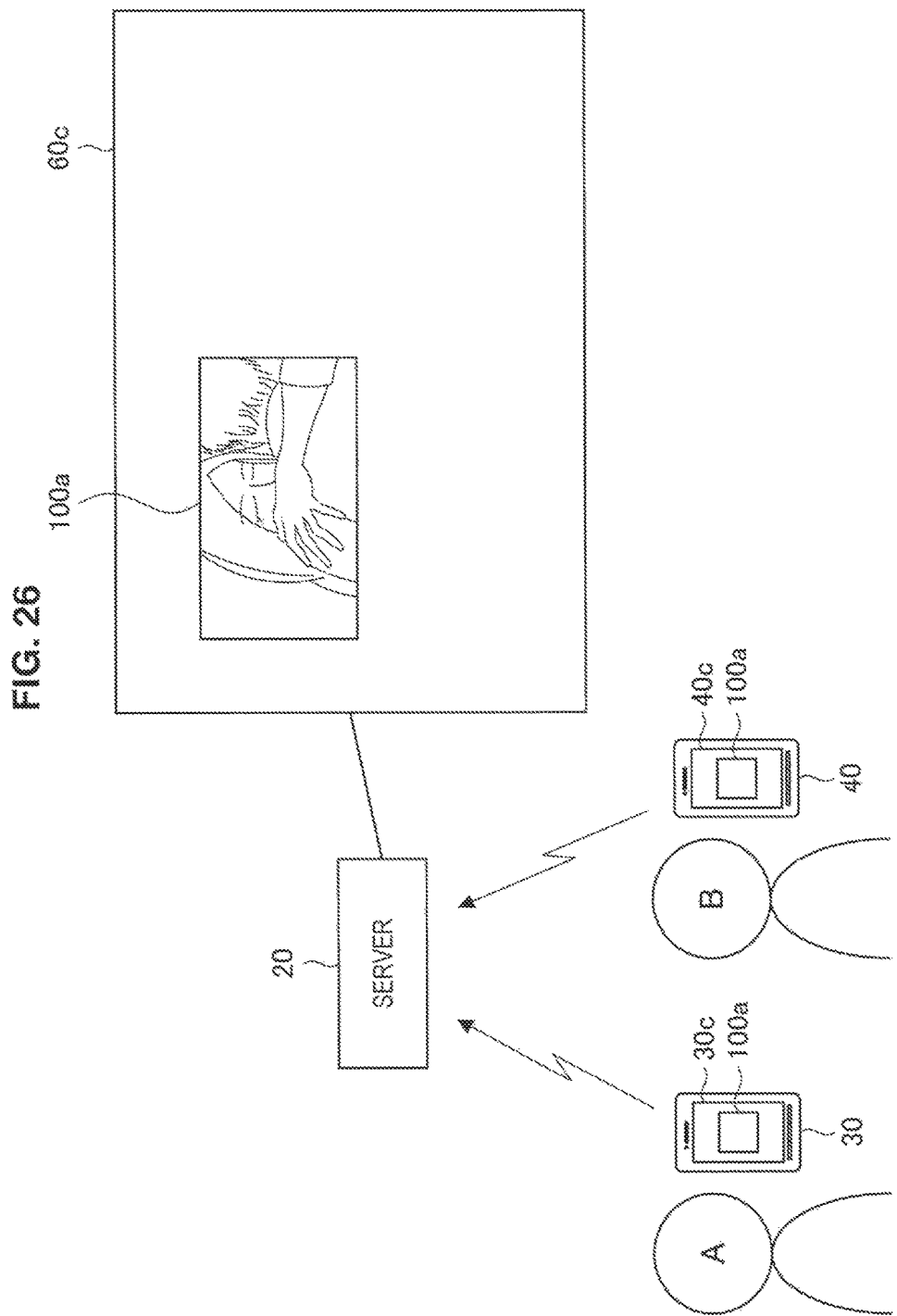
FIG. 26 is an explanatory diagram illustrating how image information is transmitted from an information processing device to another information processing device having mutually different resolutions.

A specific example of this process will be described on the basis of FIG. 26. In this example, the resolution of the information processing device 30 is lower than the resolution of the information processing device 40. However, image information 100a is displayed at the same display size on the information processing devices 30 and 40. If the user A or B moves the image information 100*a* on the information processing device 30 or 40 to the shared area 31*c* or 41*c*, the image information 100*a* is transmitted to the server 20. In the case of supposing that the server 20 does not conduct the process discussed above, the image information 100*a* is displayed on the information processing device 60 at a different display size, depending on the resolution of the transmission source information processing device 30 or 40. However, since the server 20 conducts the process discussed above, the image information 100*a* is displayed at a fixed display size, regardless of the resolution difference between the transmission source information processing devices 30 and 40.

In the above process, the image size of the moved image information is changed on the basis of the actual dimensions of the object and the resolutions of the information processing devices 30 to 60. In addition to conducting this process (or instead of conducting this process), the information processing system 10 may also adjust the image size on the basis of the total numbers of pixels in the display areas of the information processing devices 30 to 60. For example, in some cases the total number of pixels in the information processing device 60 is much larger than the total numbers of pixels in the information processing devices 30 to 50. Accordingly, the control unit 20*c* may increase the image size when transmitting moved image information transmitted from the information processing devices 30 to 50 to the other information processing device 60. Also, in addition to the above process (or instead of the above process), the information processing system 10 may also adjust the aspect ratio of the moved image information according to the aspect ratio of the destination partitioned area. For example, the control unit 20*c* may match the aspect ratio of the moved image information to the aspect ratio of the destination partitioned area. Additionally, in some cases, many pieces of image information may be displayed in the shared areas 31*c* to 61*c*. Consequently, as the image information increases, it becomes more difficult for the users A to D to survey the image information. Accordingly, the control units 30*e* to 60*f* may reduce the image size of each piece of image information as the image information increases in the shared areas 31*c* to 61*c*.

According to this process, inconsistencies in the image sizes of image information may be minimized, even if the actual dimensions, resolution, and aspect ratio of the display area differ among the information processing devices 30 to 60. Consequently, the users A to D are able to view image information (in other words, task states) smoothly.

(2-5. User Withdrawal Process)

Next, a user withdrawal process will be described on the basis of FIG. 10. For some image information, usage rights are granted only to a specific user. Such image information is protected by copyright or the like, for example, and corresponds to information such as movie content, for example. In the present embodiment, such image information may be shared among multiple users. However, when the user possessing the usage rights to the image information withdraws from the session, the image information is preferably not shared with the other users in some cases. In particular, when the session includes the information processing device 60, which is a big screen display, the image information displayed in the shared area 61*c* of the information processing device 60 is likely to be viewed by many users. Consequently, if image information whose usage rights are granted only to a specific user is being displayed in the shared area 61*c* of the information processing device 60, and that user withdraws from the session, not sharing the image information with the other users is particularly preferable. Accordingly, the information processing system 10 conducts the user withdrawal process indicated below. Note that in the following example, note that the following describes a process in which the information processing device 30 transmits, to the server 20, image information whose usage rights are granted to the user A.

Figure 10:
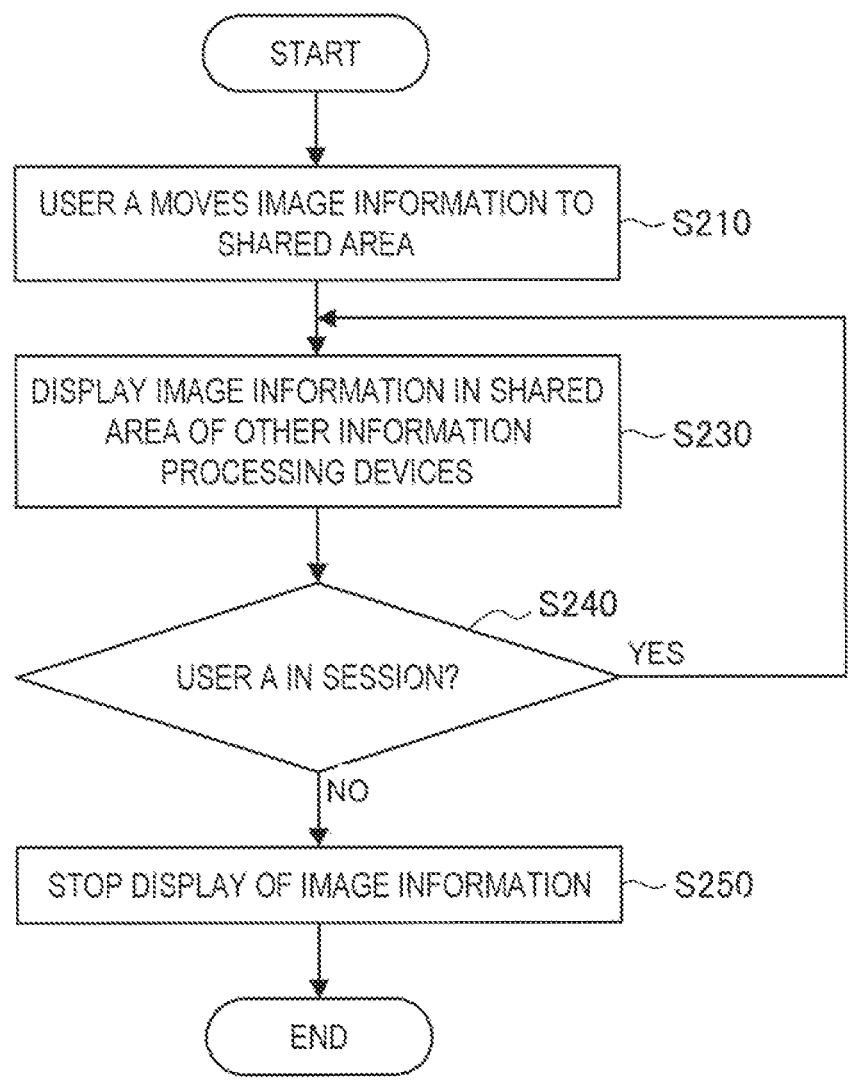
FIG. 10 is a flowchart illustrating a processing sequence by an information processing system.

In step S210 illustrated in FIG. 10, the user A performs an input operation of moving image information whose usage rights are granted to the user A from among the image information displayed in the display area of the information processing device 30 to the shared area 31*c*. Note that it is sufficient for information related to usage rights to be associated with the image information in advance. The control unit 30*e* moves the image information to the shared area 31*c* on the basis of the input operation. The control unit 30*e* generates movement notification information related to the moved image information, the post-movement partitioned area, and the post-movement display position. The specific processing details are as discussed earlier. Subsequently, the control unit 30*e* outputs device identification information and movement notification information to the communication unit 30*d*. The communication unit 30*d* transmits the movement notification information and the device identification information to the server 20.

In step S230, the communication unit 20*b* of the server 20 receives the device identification information and the movement notification information, and outputs to the control unit 20*c*. On the basis of the device identification information, the control unit 20*c* identifies the transmission source of the movement notification information (in this case, the information processing device 30). Subsequently, the control unit 20*c* searches for a session including the transmission source of the movement notification information. Furthermore, the control unit 20*c* identifies the other information processing devices 40 to 60 constituting the session.

Additionally, the control unit 20*c* decides the destination partitioned area and destination display position, on the basis of the movement notification information and the display area information for the other information processing devices 40 to 60. The specific processing details are as discussed earlier. Subsequently, the control unit 20*c* generates movement notification information related to the moved image information, the destination partitioned areas, and the destination display positions, and outputs to the communication unit 20*b*. The communication unit 20*b* transmits the movement notification information to the other information processing devices 40 to 60. The other information processing devices 30 to 60 display the image information indicated by the movement notification information in the partitioned area and at the display position indicated by the movement notification information.

In step S240, the control unit 20*c* determines whether or not the user A is present at a certain location (in other words, in the session). In the case of determining that the user A is present at the certain location, the control unit 20*c* determines that the user A is participating in the session, and returns to step S230. On the other hand, in the case of determining that the user A is not present at the certain location, the control unit 20*c* determines that the user A has withdrawn from the session, and proceeds to step S250.

At this point, the certain location is not particularly limited, and may be a location in which the display area of the information processing device 60 is viewable, for example. For example, the control unit 60*f* acquires image information from the imaging unit 60*e*, and determines whether or not the user A appears in that image information.

If the user A appears in the image information, the control unit 60f determines that the user A is present at the certain location. If the user A does not appear in the image information, the control unit 60f determines that the user A is not present at the certain location. In this case, the certain location becomes the image capture range of the imaging unit 60e.

In addition, the control unit 20c may also monitor the communication status between the information processing devices 30 and 50. Subsequently, if the information processing device 30 is present within the communication range of the information processing device 50, the control unit 20c determines that the user A is present at the certain location. If the information processing device 30 is not present within the communication range of the information processing device 50, the control unit 20c determines that the user A is not present at the certain location. In this case, the certain location becomes the communication range of the information processing device 50. Obviously, the certain location is not limited to the above examples.

In step S250, the control unit 20c stops the transmission of image information whose usage rights are granted to the user A. Consequently, the image information whose usage rights are granted to the user A is removed from the shared areas 41c to 61c of the other information processing devices 40 to 60. After that, the information processing system 10 ends the process.

Figure 27:
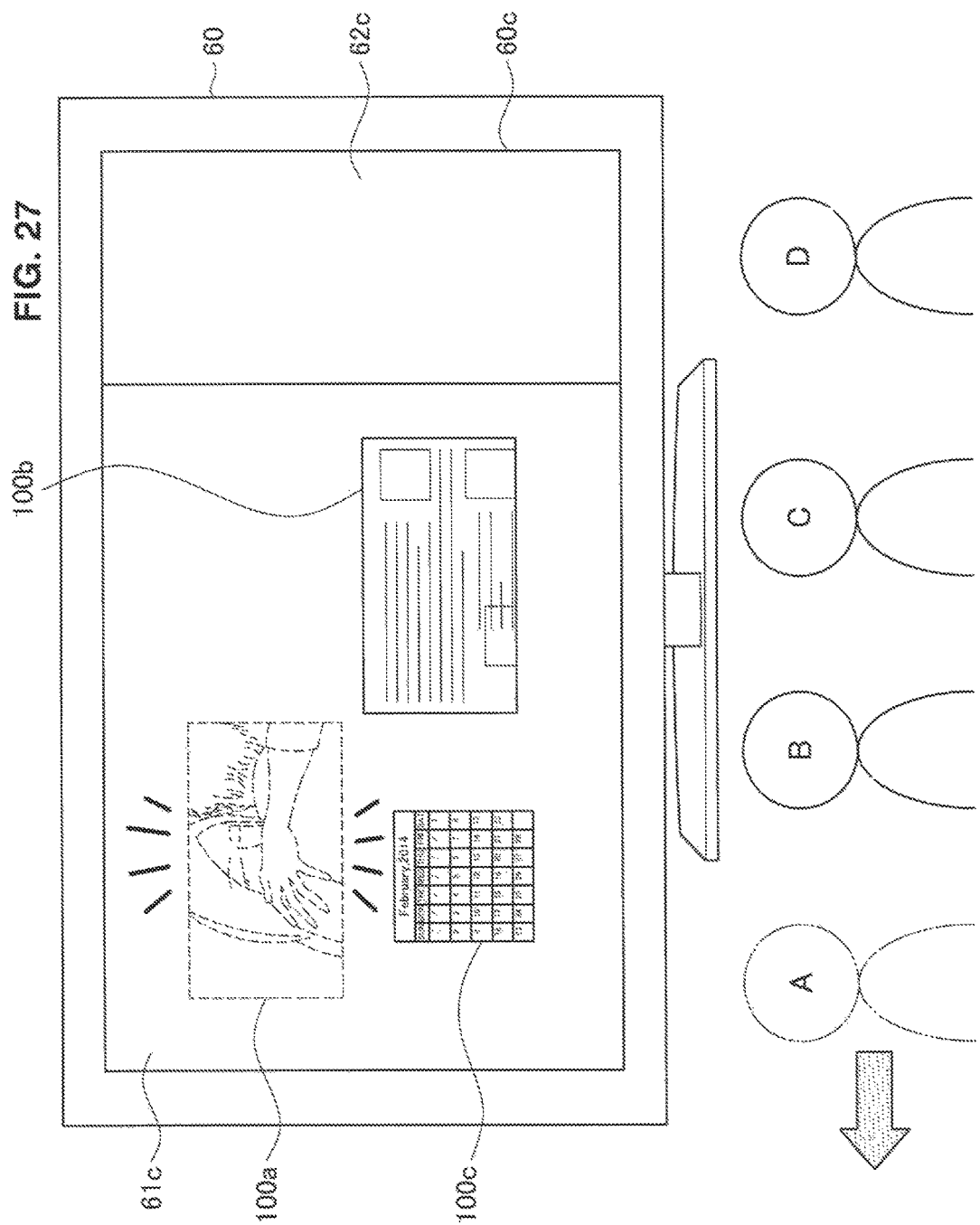
FIG. 27 is an explanatory diagram illustrating how a user leaves a session.

A specific example of this process will be described on the basis of FIG. 27. In this example, the image information 100a to 100c is being displayed in the shared area 61c of the information processing device 60. Among this image information 100a to 100c, usage rights to the image information 100a are granted only to the user A.

The control unit 20c acquires image information from the imaging unit 60e, and determines whether or not the user A appears in the image information. In FIG. 27, the user A is withdrawing from the image capture range of the imaging unit 60e. Consequently, the user A does not appear in the image information. Accordingly, the control unit 20c stop the transmission of the image information 100a. As a result, the image information 100a is removed from the shared area 61c of the information processing device 60.

Figure 28:
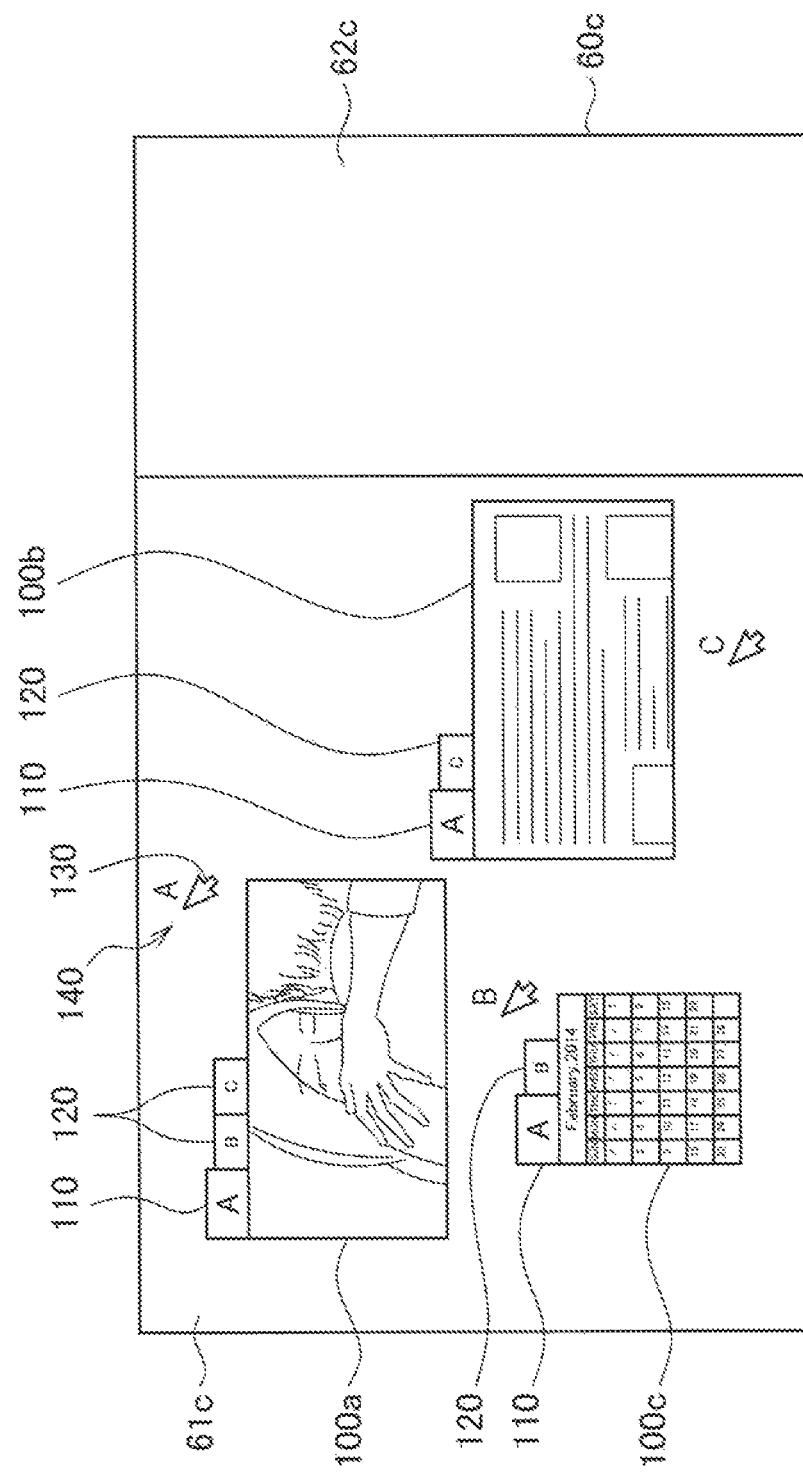
FIG. 28 is an explanatory diagram illustrating an example of a screen displayed by an information processing device.

When the user withdrawal process is conducted, it is preferable from the perspective of the users A to D to clearly indicate which image information has usage restrictions among the image information displayed in the shared area. Accordingly, the information processing devices 30 to 60 may also attach indicators to the image information in the shared areas 31c to 61c. An example display is illustrated in FIG. 28. In this example, the control unit 61f of the information processing device 60 attaches indicators 110 and 120 to the image information 100c to 100c in the shared area 61c. The indicator 110 indicates the owner of the image information. Herein, the owner of image information is the user who is granted the usage rights to the image information, for example. The user who moved image information from his or her personal area to the shared area may also be treated as the owner of that image information. The indicator 120 indicates a person who is performing a task based on the image information.

Note that it is sufficient for information related to the owner of image information to be transmitted from the owner's information processing device to the server 20. Also, it is sufficient for information related to the user who is performing a task based on image information to be transmitted from the information processing device of the user performing the task to the server 20.

In addition, the control unit 60f displays cursors 130 operated by the users, and also displays indicators 140 near the cursors 130. Each indicator 140 indicates the user who is the operating agent of that cursor. According to this example display, the users A to D are able to easily grasp the owners of image information and the users who are participating in a task of image information. Note that the controls units 30e to 60f may display the above indicators 110, 120, and 140, as well as indicators of so-called observers who are not participating in a task.

(2-6. Session Management Process)

Figure 11:
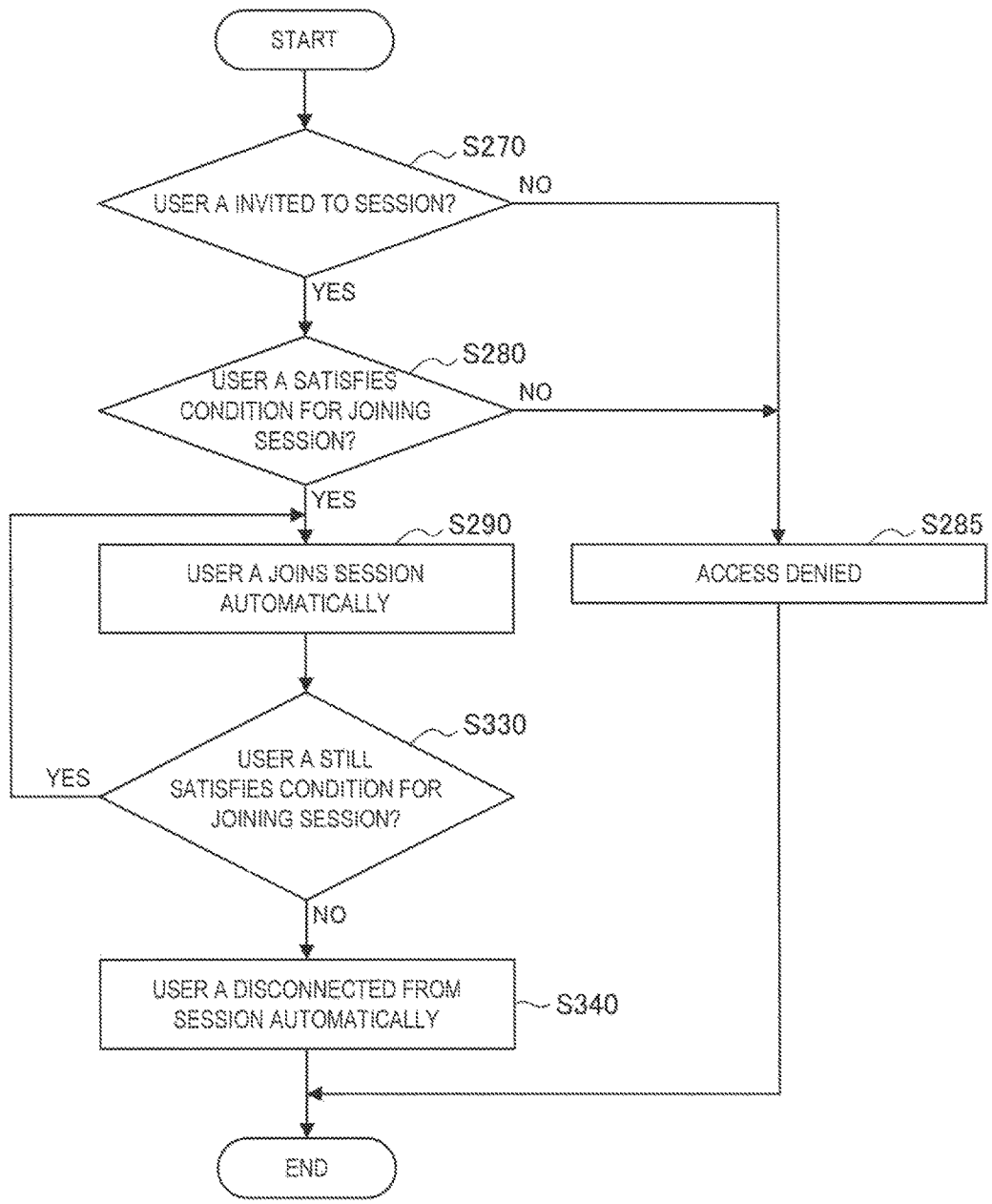
FIG. 11 is a flowchart illustrating a processing sequence by an information processing system.

Next, a session management process will be described on the basis of FIG. 11. As discussed above, when a user wants to join a session (specifically, when wanting to make the user's information processing device join a session), the user needs to make a join request to join the session. However, in a session formed at an event venue (or a party venue), for example, in some cases it is preferable to have a user join the session automatically when the user enters the event venue. In this case, the burden of the join request may be skipped, which is convenient for the user. Also, a user who is far away from the event venue may share image information with users at the event venue, and thereby pseudo-join the session. Accordingly, the information processing system 10 conducts the session management process indicated below. The following describes a process for the case of the user A joining a session. The users B to D discussed earlier do not necessarily need to participate in this session.

In step S270, the control unit 20c determines whether or not the user A is invited to the session. Note that the control unit 20c may also cause the storage unit 20a to store in advance whether or not the user A is invited. In the case of determining that the user A is invited to the session, the control unit 20c proceeds to step S280, whereas in the case of determining that the user A is not invited, the control unit 20c proceeds to step S285.

In step S280, the control unit 20c determines whether or not the user A satisfies a condition for joining the session. The condition for joining the session is not particularly limited, and may be the following, for example. Namely, the condition for joining the session may be that the user A is present at a specific location (for example, the event venue). To determine this condition, a base station for wireless communication is placed inside the specific location, for example. Subsequently, the control unit 20c monitors communication availability between the base station and the information processing device 30 of the user A. If the information processing device 30 is present within the communication range of the base station, the control unit 20c determines that the user A is present at the specific location, or in other words, that the condition for joining the session is satisfied. On the other hand, if the information processing device 30 is not present within the communication range of the base station, the control unit 20c determines that the user A is not present at the specific location, or in other words, that the condition for joining the session is not satisfied. Additionally, the control unit 20c may also use GPS to determine the condition for joining the session. In other words, the control unit 20c may use GPS to identify the position of the user A (that is, the position of the information processing device 30), and based on this result, determine whether or not the user A is present at the specific location.

In addition, the condition for joining the session may also be that the image display application is executed within a specific time (for example, the time frame of convening the event). To determine this condition, the control unit 20c may, for example, query whether or not the image display application is being executed on the information processing device 30 at an arbitrary timing within the specific time. If the information processing device 30 is executing the image display application within the specific time, the control unit 20c determines that the condition for joining the session is satisfied. If the information processing device 30 is not executing the image display application within the specific time, the control unit 20c determines that the condition for joining the session is not satisfied. The condition for joining the session may also be a combination of the above two conditions. The control unit 20c may also adjust the condition for joining the session (access permission level) arbitrarily (or according to input operations by a session administrator).

Subsequently, if the condition for joining the session is satisfied, the control unit 20c proceeds to step S290, whereas if the condition for joining the session is not satisfied, the control unit 20c proceeds to step S285.

In step S285, the control unit 20c does not permit the user A to join the session. In other words, the control unit 20c does not grant access from the information processing device 30. After that, the information processing system 10 ends the process. Note that even if the user A is not invited to the session, the control unit 20c may still permit the user A to join the session with limitations. These limitations may be, for example, not accepting input operations on specific image information. Additionally, the control unit 20c may also set an invitation level for each user, and set the above limitations according to the invitation level.

In step S290, the control unit 20c causes the user A to join the session automatically. Specifically, the control unit 20c causes the information processing device 30 to join the session. In step S330, the control unit 20c determines whether or not the user A still satisfies the condition for joining the session. In the case of determining that the user A still satisfies the condition for joining the session, the control unit 20c proceeds to step S290, whereas in the case of determining that the user A does not satisfy the condition for joining the session, the control unit 20c proceeds to step S340.

In step S340, the control unit 20c disconnects the user A from the session automatically. In other words, the control unit 20c disconnects the information processing device 30 from the session automatically. After that, the information processing system 10 ends the process.

Figure 29:
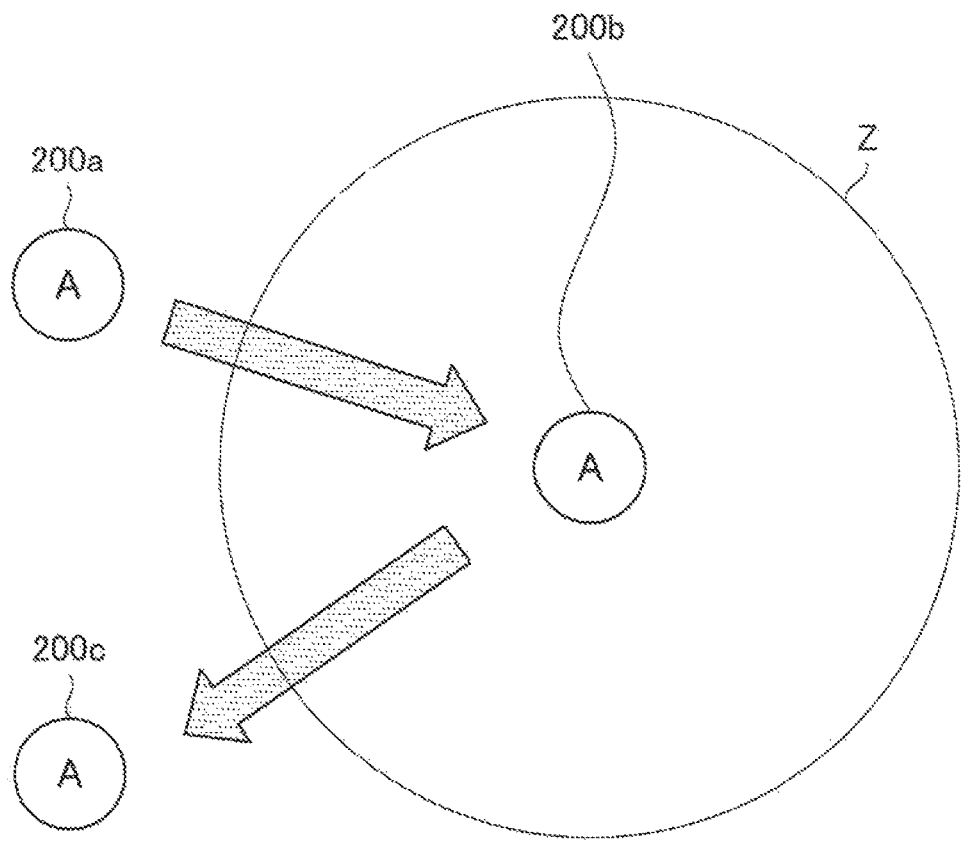
FIG. 29 is an explanatory diagram illustrating how a user joins and leaves a session.

A specific example of this process will be described on the basis of FIG. 29. In FIG. 29, the communication range of the base station is indicated by the area Z. If the user A is present at a position 200a outside the communication range of the base station, the control unit 20c does not permit the user A to join the session. After that, if the user A moves to a position 200b inside the communication range of the base station, the control unit 20c determines that the user A satisfies the condition for joining the session, and causes the user A to join the session automatically. After that, if the user A moves to a position 200c outside the communication range of the base station, the control unit 20c determines that the user A does not satisfy the condition for joining the session, and disconnects the user A from the session automatically.

According to this process, the user A is able to connect to or withdraw from a session temporarily and easily. Consequently, the information processing system 10 is able to achieve both user convenience and session safety (such as security and copyright protection). Additionally, the server 20 is able to easily grasp the status of joining the session.

(2-7. Group-to-Group Sharing Process)

Figure 30:
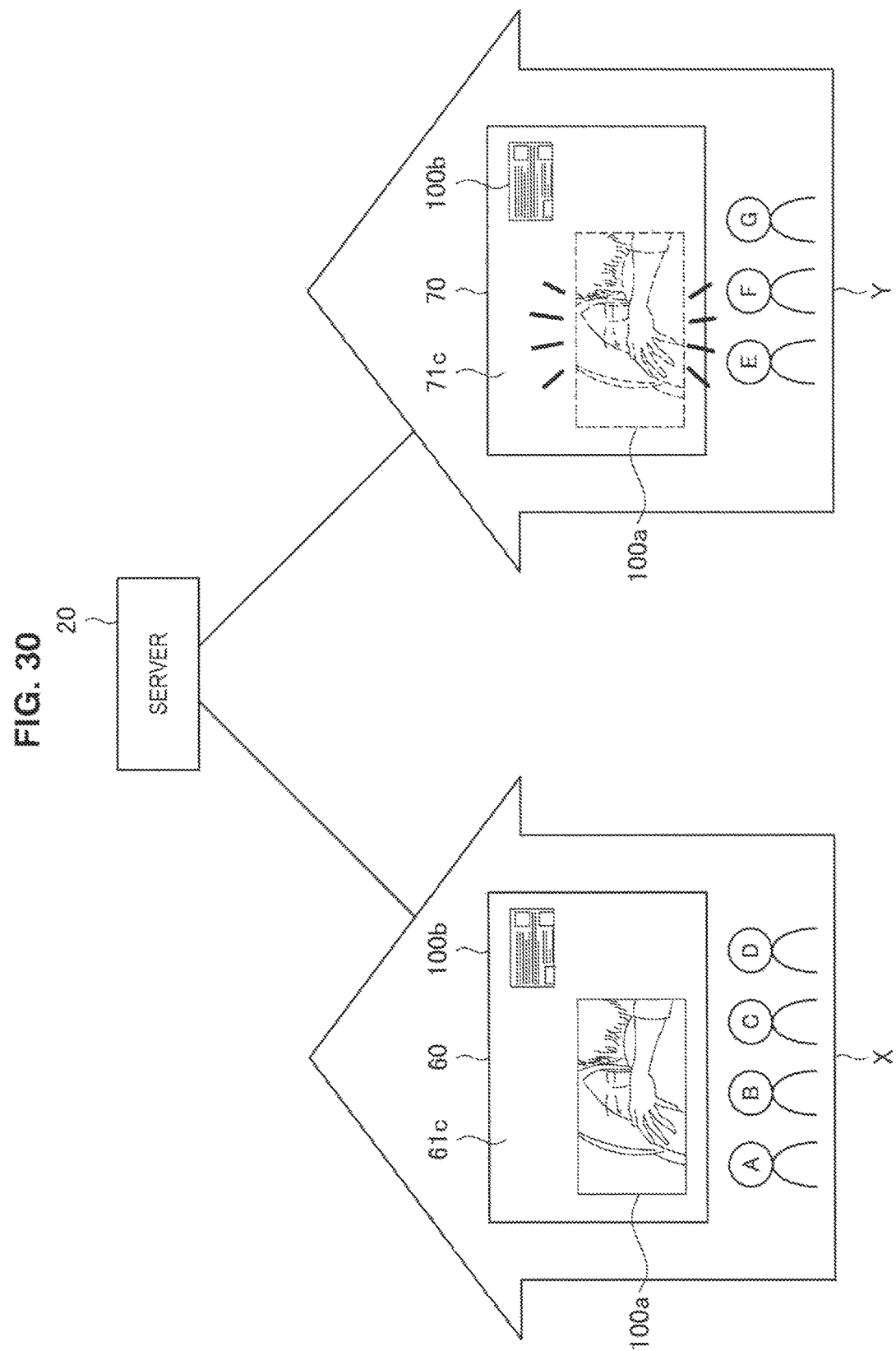
FIG. 30 is an explanatory diagram illustrating how different groups join the same session.

Next, a group-to-group sharing process will be described on the basis of FIG. 12. In the example discussed above, the users A to D form a single group, and a session is formed with this group only. Note that in the present embodiment, a group means a group of users viewing either one of the information processing devices 60 and 70, which are big screen displays. However, multiple groups may constitute a single session in some cases. For example, as illustrated in FIG. 30, a group X including the information processing device 60 and a group Y including the information processing device 70 may form the same session in some cases. The group X includes the users A to D, while the group Y includes the users E to G. To form such a session, in the presupposed process discussed earlier, it is sufficient for the information processing devices 30 to 70 to transmit a request to join the session to the server 20. The server 20 conducts the basic process discussed earlier between the groups X and Y in the session. Note that although the information processing device 70 is displaying only a shared area 71c in FIG. 30, obviously a personal area and a temporary saving area may also be displayed.

However, the groups X and Y illustrated in FIG. 30 exist in mutually different locations (at different homes). Consequently, image information whose usage rights are granted only to the user A may be shared within the group X, but sharing with the group Y is not preferable in some cases. Accordingly, the information processing system 10 conducts the group-to-group sharing process indicated below. The following describes a process for the case in which the groups X and Y illustrated in FIG. 3 form a single session.

Figure 12:
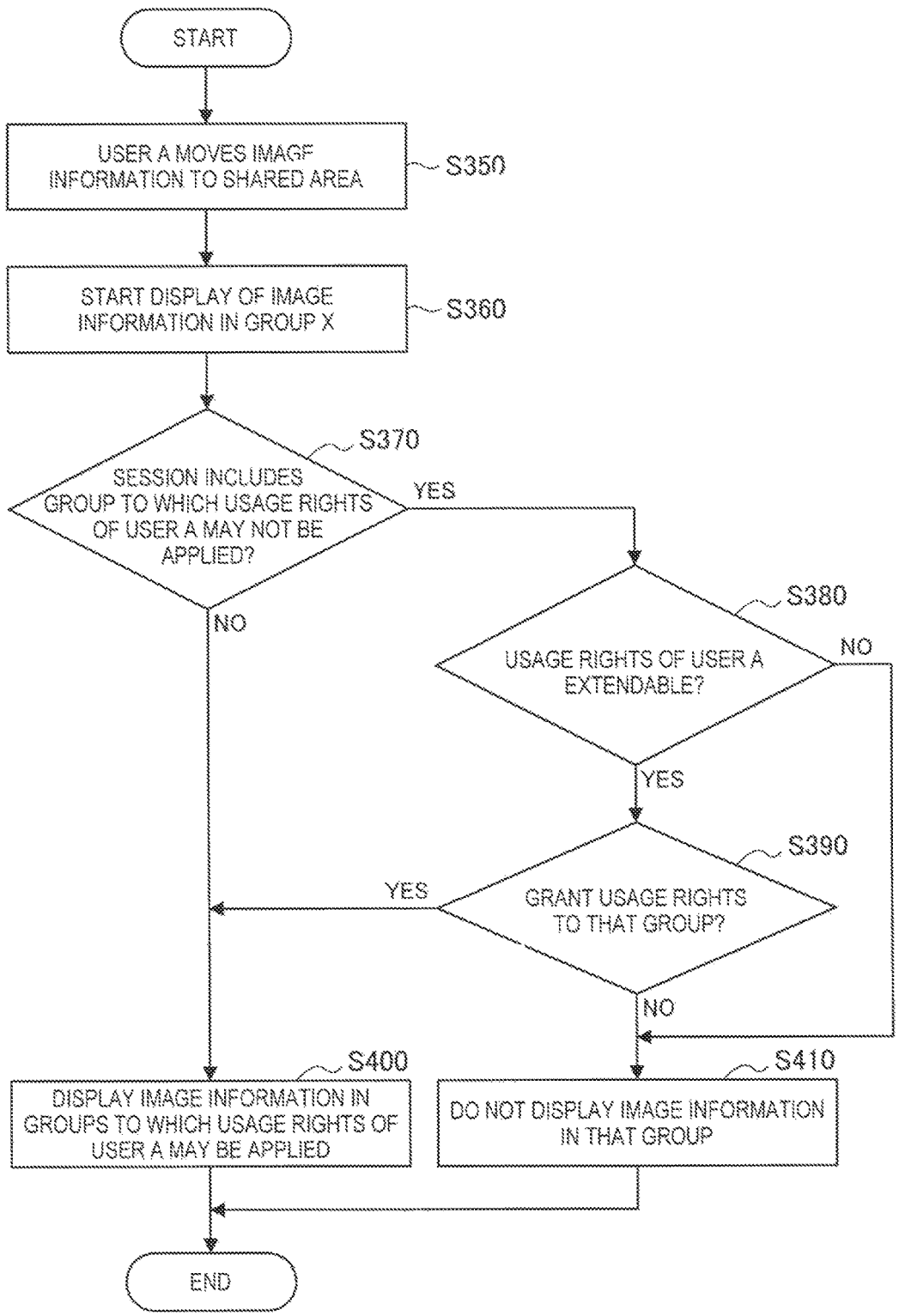
FIG. 12 is a flowchart illustrating a processing sequence by an information processing system.

In step S350 illustrated in FIG. 12, the user A performs an input operation of moving image information whose usage rights are granted to the user A from among the image information displayed in the display area of the information processing device 30 to the shared area 31c. Note that it is sufficient for information related to usage rights to be associated with the image information in advance. The control unit 30e moves the image information to the shared area 31c on the basis of the input operation. The control unit 30e generates movement notification information related to the moved image information, the post-movement partitioned area, and the post-movement display position. The specific processing details are as discussed earlier. Subsequently, the control unit 30e outputs device identification information and movement notification information to the communication unit 30d. The communication unit 30d transmits the movement notification information and the device identification information to the server 20.

In step S360, the communication unit 20b of the server 20 receives the device identification information and the movement notification information, and outputs to the control unit 20c. On the basis of the device identification information, the control unit 20c identifies the transmission source of the movement notification information (in this case, the information processing device 30). Subsequently, the control unit 20c searches for a session including the transmission source of the movement notification information. Furthermore, the control unit 20c identifies the information processing devices 40 to 60 constituting the same group X as the transmission source in the session. Note that the group distinguishing method is not particularly limited, and may be the following method, for example. Namely, the communication unit 60d of the information processing device 60 attempts wireless communication with nearby information processing devices. Subsequently, the control unit 60f determines that responding information processing devices belong to the same group, and notifies the server 20 of the result. The information processing device 70 also conducts a similar process.

Additionally, the control unit 20c decides the destination partitioned area and destination display position, on the basis of the movement notification information and the display area information for the information processing devices 40 to 60. The specific processing details are as discussed earlier. Subsequently, the control unit 20c generates movement notification information related to the moved image information, the destination partitioned areas, and the destination display positions, and outputs to the communication unit 20b. The communication unit 20b transmits the movement notification information to the information processing devices 40 to 60. The other information processing devices 40 to 60 display the image information indicated by the movement notification information in the partitioned area and at the display position indicated by the movement notification information. Consequently, the server 20 starts the display (sharing) of image information among the group X.

In step S370, the server 20 determines the session includes a group to which the usage rights of the user A may not be applied. In this example, the server 20 determines whether or not the usage rights of the user A may be applied to the group Y. In the case of determining that the usage rights of the user A may be applied to the group Y, the server 20 proceeds to step S400, whereas in the case of determining that the usage rights of the user A may not be applied to the group Y, the server 20 proceeds to step S380.

In step S380, the server 20 determines whether or not the usage rights of the user A are extendable to another group (that is, the information processing device 70). If the usage rights of the user A are not extendable to another group under any conditions, the server 20 proceeds to step S410. On the other hand, if the usage rights of the user A are extendable to other users under some condition (for example, if payment is made), the server 20 proceeds to step S390.

In step S390, the server 20 determines whether or not to grant the usage rights of the user A to the group Y. For example, if the usage rights of the user A are extendable under some condition, and the group Y satisfies that condition, the server 20 grants the usage rights of the user A to the group Y. Such a condition may complying with payment of a certain monetary amount, for example. The control unit 20c may also display the condition on the information processing device 70. For example, the server 20 may transmit text information such as "This image information may be displayed if a payment of XX yen is made", to the information processing device 70, and the control unit 70f of the information processing device 70 may display such text information on the display unit 70c. In the case of determining to grant usage rights to the group Y, the server 20 proceeds to step S400. On the other hand, in the case of not granting the usage rights of the user A to the group Y (for example, if the above condition is not satisfied), the server 20 proceeds to step S410.

In step S400, the server 20 displays (shares) image information among the groups to which the usage rights of the user A may be applied, which in this example are the groups X and Y. Specifically, the server 20 also transmits the movement notification information discussed above to the information processing device 70. The control unit 70f of the information processing device 70 displays image information in the shared area 71c on the basis of the movement notification information. After that, the information processing system 10 ends the process.

In step S410, the server 20 does not display (share) image information among the group Y. After that, the information processing system 10 ends the process.

(2-8. Other Processes)

The information processing devices 30 to 70 and the server 20 may also conduct the following processes in addition to the above processes. The control unit 20c of the server 20 may also not share image information in the shared area with some information processing devices. In other words, the control unit 20c may switch between synchronization and asynchronization of the image display application. As a specific process, it is sufficient for the control unit 20c to not transmit the movement notification information discussed earlier to some information processing devices. The control unit 20c may also switch between synchronization and asynchronization according to an input operation by a user, for example.

In addition, although the information processing system 10 causes image information to be displayed in the shared areas 31c to 71c of the information processing devices 30 to 70, the information processing system 10 may also limit participation in tasks based on the image information to specific users only. As a specific process, if image information is displayed in the shared areas 31c to 71c due to another information processing device, the control units 30e to 70f of the information processing devices 30 to 70 may also not accept input operations on that image information. In this case, only the information processing device that moved the image information from the personal area to the shared area accepts input operations.

The control units 60f and 70f of the information processing devices 60 and 70 may also adjust the display size of image information (that is, the image size) on the basis of a degree of attention on the image information. For example, the control units 60f and 70f may also increase the display size of image information with a large degree of attention. Consequently, the users A to D are able to perform tasks more efficiently.

Herein, the degree of attention on a piece of image information is expressed as the number of users viewing the image information, for example. The degree of attention is large to the extent that the number of users viewing the image information is large. In this case, the control units 60f and 70f may also specify the degree of attention on image information on the basis of captured images provided by the imaging units 60e and 70e.

In addition, the degree of attention on a piece of image information is expressed as the number of users discussing the image information. The degree of attention is large to the extent that the number of users discussing the image information is large. In this case, a speech recognition unit (for example, a microphone) is provided in the information processing devices 60 and 70. The control units 60f and 70f then identify the number of users discussing the image information on the basis of speech information provided by the speech recognition unit.

The control units 60f and 70f of the information processing devices 60 and 70 may also share such variations in image information with the other information processing devices 30 to 50. The sharing of variations in image information may be conducted according to a process similar to the basic process discussed earlier, for example. Additionally, the other information processing devices 30 to 50 may also conduct similar processes.

In addition, the control units 30e to 70f of the information processing devices 30 to 70 may also adjust the display size of image information on the basis of the states of tasks performed on the image information. For example, the control units 30e to 70f may also increase the display size of image information on which tasks are performed frequently. Consequently, the users A to D are able to perform tasks more efficiently. The information processing devices 30 to 70 may also share such variations in image information with the information processing devices 30 to 70. The sharing of variations in image information may be conducted according to a process similar to the basic process discussed earlier, for example.

Additionally, the information processing devices 60 and 70 may also be equipped with a microphone. The control units 60f and 70f may then store user operation logs and speech information (such as conversations between users) for each user (that is, in a structured manner). The operation log of a user may be stored as a log of variations (video) in image information displayed in the display area, for example. The operation log may also be information about operations (for example, touch operations, drag operations, and gesture operations) input by the user.

As above, according to the present embodiment, the information processing system 10 is able to synchronize the image display applications executed by the information processing devices 30 to 70. Consequently, users are able to perform various tasks using the synchronized image display applications.

Specifically, since the information processing system 10 is able to synchronize image information displayed on the information processing devices 30 to 70, the users are able to perform tasks using the synchronized image information. In other words, the users are able to divide up work into respective tasks or work cooperatively while viewing multiple pieces of image information (task states) at the same time in parallel. Additionally, the users are able to perform tasks graphically and dynamically.

Also, since the information processing system 10 synchronizes image information displayed in the shared areas 31c to 71c, the users are able to easily grasp which image information is synchronized.

Also, if the information processing device 30 moves image information from the personal area 32c to the shared area 31c, for example, the information processing system 10 causes the image information to be displayed in the shared areas 31c to 71c of the other information processing devices 40 to 70. Consequently, each user is able to share image information with the other users easily.

Also, if the information processing device 30 moves image information from the shared area 31c to the temporary saving area 33c, for example, the information processing system 10 moves the image information displayed in the shared areas 41c to 71c of the other information processing devices 40 to 70 to the temporary saving areas. Consequently, each user is able to share image information that he or she wants to save temporarily with the other users easily.

In addition, the information processing system 10 adjusts the image size of image information displayed on the information processing devices 30 to 70, on the basis of the display areas of the information processing devices 30 to 70. Consequently, each user is able to view image information more smoothly.

More specifically, the information processing system 10 adjusts the image size of image information on the basis of the resolution of the display area. Consequently, each user is able to view image information more smoothly.

In addition, the information processing system 10 adjusts the image size of image information on the basis of the actual dimensions of an object drawn by the image information. Consequently, each user is able to view image information more smoothly.

In addition, the information processing system 10 adjusts the image size of image information on the basis of a preset standard image size. Consequently, each user is able to view image information more smoothly.

Also, if the information processing device 30 is displaying image information whose usage rights are granted to the user A, for example, the information processing system 10 decides whether or not to synchronize the image display applications on the basis of the status of the user A. Consequently, the information processing system 10 is able to enable the sharing of image information among users while also maintaining session safety (for example, copyright protection). Herein, the status of the user A may be, for example, whether or not the user A is present at a certain location, or whether or not the usage rights of the user A are extendable (applicable) to other information processing devices.

In addition, if the usage rights of the user A are extendable to the other information processing device 70, and in addition, a certain condition is satisfied, the information processing system 10 synchronizes the image display applications executed by the information processing devices 30 to 70. Specifically, the information processing system 10 causes the information processing device 70 to display image information whose usage rights are granted to the user A.

In addition, the information processing system 10 decides whether or not to synchronize the image display applications on the basis of the status of the information processing device 30, for example. In other words, the information processing system 10 decides whether or not to cause the user A of the information processing device 30 to join the session. Consequently, a user is able to join or withdraw from a session temporarily and easily.

More specifically, the information processing system 10 decides whether or not to synchronize the image display applications on the basis of the position of the information processing device 30, for example. In other words, the information processing system 10 decides whether or not to cause the user A of the information processing device 30 to join the session. Consequently, a user is able to join or withdraw from a session temporarily and easily.

In addition, the information processing system 10 decides whether or not to synchronize the image display applications on the basis of the time when the information processing device 30 executes the image display application, for example. In other words, the information processing system 10 decides whether or not to cause the user A of the information processing device 30 to join the session. Consequently, a user is able to join or withdraw from a session temporarily and easily. Note that the above advantageous effects are merely illustrative examples, and the present embodiment may include any of the advantageous effects described in this specification, or other advantageous effects.

In addition, obviously the processes given above may also be combined arbitrarily. For example, the information processing system 10 may conduct the processes illustrated in FIGS. 8 to 10 on the group X illustrated in FIG. 30. Additionally, the information processing system 10 may also conduct the process for joining the session of the group X, or in other words the process illustrated in FIG. 11, on a user in a different location than the group X.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing system including:
a control unit configured to perform a control of synchronizing a first image display application executed by a first information processing device and a second image display application executed by a second information processing device.

(2) The information processing system according to (1), wherein
the control unit synchronizes image information displayed on the first information processing device and image information displayed on the second information processing device.

(3) The information processing system according to (2), wherein
the first and the second information processing devices set a shared area inside a display area for image information, and
the control unit synchronizes image information displayed in the shared area.

(4) The information processing system according to (3), wherein
the first and the second information processing devices set a personal area inside the display area for image information, and in addition, move the image information between the personal area and the shared area, based on an input operation by a user, and
if one information processing device from among the first and the second information processing devices moves one piece of image information from the personal area to the shared area, the control unit causes the one piece of image information to be displayed in the shared area of the other information processing device.

(5) The information processing system according to (3) or (4), wherein
the first and the second information processing devices set a personal area inside the display area for image information, and in addition, move the image information between the personal area and the shared area, based on an input operation by a user, and
if one information processing device from among the first and the second information processing devices moves one piece of image information from the shared area to the personal area, the control unit removes the one piece of image information from the shared area of the other information processing device.

(6) The information processing system according to any one of (3) to (5), wherein
the first and the second information processing devices set a temporary saving area inside the display area for image information, and in addition, move the image information between the shared area and the temporary saving area, based on an input operation by a user, and
if one information processing device from among the first and the second information processing devices moves one piece of image information from the shared area to the temporary saving area, the control unit moves the one piece of image information displayed in the shared area of the other information processing device to the temporary saving area.

(7) The information processing system according to any one of (1) to (6), wherein
the control unit adjusts an image size of image information displayed on the first and the second information processing devices, based on the display area of the first and the second information processing devices.

(8) The information processing system according to (7), wherein
the control unit adjusts the image size of the image information, based on a resolution of the display area.

(9) The information processing system according to (7) or (8), wherein
the control unit adjusts the image size of the image information, based on actual dimensions of an object drawn by the image information.

(10) The information processing system according to (7) or (8), wherein
the control unit adjusts the image size of the image information, based on a preset standard image size.

(11) The information processing system according to any one of (1) to (10), wherein
if one information processing device from among the first and the second information processing devices is displaying image information whose usage rights are granted to a user of the one information processing device, the control unit decides whether or not to synchronize the first and the second image display applications, based on a status of the user of the one information processing device.

(12) The information processing system according to (11), wherein
if the usage rights of the user of the one information processing device are extendable to the other information processing device, and if a certain condition is satisfied, the control unit synchronizes the first and the second image display applications.

(13) The information processing system according to any one of (1) to (12), wherein
the control unit decides whether or not to synchronize the first and the second image display applications, based on a status of at least one information processing device from among the first and the second information processing devices.

(14) The information processing system according to (13), wherein
the control unit decides whether or not to synchronize the first and the second image display applications, based on a position of at least one information processing device from among the first and the second information processing devices.

(15) The information processing system according to (13), wherein
the control unit decides whether or not to synchronize the first and the second image display applications, based on at least one from among a time when the first information processing device executes the first image display application and a time when the second information processing device executes the second image display application.

(16) An information processing method including:
performing a control of synchronizing a first image display application executed by a first information processing device and a second image display application executed by a second information processing device.

(17) A program for causing a computer to realize:
a control function configured to perform a control of synchronizing a first image display application executed by

REFERENCE SIGNS LIST 10 information processing system
20 server
20c control unit
30 to 70 information processing device
30e, 40e, 50e, 60f, 70f control unit
31c to 71c shared area
32c to 62c personal area
33c to 63c temporary saving area

The invention claimed is:

1. An information processing system, comprising:
a central processing unit (CPU) configured to:
synchronize a first image display application executed by a first information processing device and a second image display application executed by a second information processing device,
wherein a display screen of each of the first information processing device and the second information processing device is partitioned into a temporary saving area, a shared area, and a personal area,
wherein first image information displayed in the shared area of at least one of the first information processing device or the second information processing device is sharable between the first information processing device and the second information processing device,
wherein second image information displayed in the personal area of at least one of the first information processing device or the second information processing device is non-sharable between the first information processing device and the second information processing device, and
wherein third image information of the temporary saving area of the display screen of the first information processing device and the second information processing device is sharable between the first information processing device and the second information processing device; and
control the second information processing device to display the first image information in the shared area of the display screen of the second information processing device, based on a first user input operation to move the first image information from the shared area of the display screen of the first information processing device to the temporary saving area of the display screen of the first information processing device.

2. The information processing system according to claim 1, wherein the CPU is further configured to synchronize the display of the first image information on the first information processing device and the second information processing device, and
wherein the first image information is displayed in the shared area of the display screen of the at least one of the first information processing device or the second information processing device.

3. The information processing system according to claim 1, wherein the CPU is further configured to control the second information processing device to display the first image information in the shared area of the display screen of the second information processing device, based on a second user input operation to move the first image information from the personal area of the display screen of the first information processing device to the shared area of the display screen of the first information processing device.

4. The information processing system according to claim 1, wherein the CPU is further configured to remove the display of the first image information from the shared area of the display screen of the second information processing device based on a second user input operation to move the first image information from the shared area of the display screen of the first information processing device to the personal area of the display screen of the first information processing device.

5. The information processing system according to claim 1, wherein the CPU is further configured to adjust an image size of the first image information displayed in the shared area of the display screen of the first information processing device and the second information processing device, and wherein the image size is adjusted based on a size of the display screen of each of the first information processing device and the second information processing device.

6. The information processing system according to claim 1, wherein the CPU is further configured to adjust an image size of the first image information displayed in the shared area of the display screen of the first information processing device and the second information processing device, and wherein the image size is adjusted based on a resolution of the display screen of each of the first information processing device and the second information processing device.

7. The information processing system according to claim 1, wherein the CPU is further configured to adjust an image size of the first image information displayed in the shared area of the display screen of the first information processing device and the second information processing device, and wherein the image size is adjusted based on dimensions of an object drawn by the first image information.

8. The information processing system according to claim 1, wherein the CPU is further configured to adjust an image size of the first image information displayed in the shared area of the display screen of the first information processing device and the second information processing device, and wherein the image size is adjusted based on a standard image size.

9. The information processing system according to claim 1, wherein the CPU is further configured to determine the synchronization of the first image display application and the second image display application based on a status of a user of the first information processing device and based on display of fourth image information in the shared area of the display screen of the first information processing device, and wherein the fourth image information has usage rights granted to the user.

10. The information processing system according to claim 9, wherein the CPU is further configured to synchronize the first image display application and the second image display application based on the usage rights of the user of the first information processing device, and wherein the usage rights are extendable to the second information processing device.

11. The information processing system according to claim 1, wherein the CPU is further configured to determine the synchronization of the first image display application and the second image display application based on a status of the at least one of the first information processing device or the second information processing device.

12. The information processing system according to claim 1, wherein the CPU is further configured to determine the synchronization of the first image display application and the second image display application based on a position of the at least one of the first information processing device or the second information processing device.

13. The information processing system according to claim 1, wherein the CPU is further configured to determine the synchronization of the first image display application and the second image display application based on at least one of a first time of execution of the first image display application by the first information processing device or a second time of execution of the second image display application by the second information processing device.

14. An information processing method, comprising:
    synchronizing a first image display application executed by a first information processing device and a second image display application executed by a second information processing device,
    wherein a display screen of each of the first information processing device and the second information processing device is partitioned into a temporary saving area, a shared area, and a personal area,
    wherein first image information displayed in the shared area of at least one of the first information processing device or the second information processing device is sharable between the first information processing device and the second information processing device,
    wherein second image information displayed in the personal area of at least one of the first information processing device or the second information processing device is non-sharable between the first information processing device and the second information processing device, and
    wherein third image information of the temporary saving area of the display screen of the first information processing device and the second information processing device is sharable between the first information processing device and the second information processing device; and
    controlling the second information processing device to display the first image information in the shared area of the display screen of the second information processing device, based on a first user input operation to move the first image information from the shared area of the display screen of the first information processing device to the temporary saving area of the display screen of the first information processing device.

15. A non-transitory computer-readable medium having stored thereon, computer-executable instructions, which when executed by a computer, cause the computer to execute operations, the operations comprising:
    synchronizing a first image display application executed by a first information processing device and a second image display application executed by a second information processing device,
    wherein a display screen of each of the first information processing device and the second information processing device is partitioned into a temporary saving area, a shared area, and a personal area,
    wherein first image information displayed in the shared area of at least one of the first information processing device or the second information processing device is sharable between the first information processing device and the second information processing device,
    wherein second image information displayed in the personal area of at least one of the first information processing device or the second information processing device is non-sharable between the first information processing device and the second information processing device, and
    wherein third image information of the temporary saving area of the display screen of the first information processing device and the second information processing device is sharable between the first information processing device and the second information processing device; and
    controlling the second information processing device to display the first image information in the shared area of the display screen of the second information processing device, based on a first user input operation to move the first image information from the shared area of the display screen of the first information processing device to the temporary saving area of the display screen of the first information processing device.

* * * * *